(12) United States Patent
Nakajima et al.

(10) Patent No.: US 12,068,642 B2
(45) Date of Patent: Aug. 20, 2024

(54) WIRE POSITION CORRECTION METHOD AND WIRE POSITION CORRECTION APPARATUS

(71) Applicant: HONDA MOTOR CO., LTD., Tokyo (JP)

(72) Inventors: Junji Nakajima, Tochigi (JP); Hideaki Onda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 486 days.

(21) Appl. No.: 17/199,416

(22) Filed: Mar. 11, 2021

(65) Prior Publication Data

US 2021/0296973 A1   Sep. 23, 2021

(30) Foreign Application Priority Data

Mar. 18, 2020 (JP) ................. 2020-047192

(51) Int. Cl.
| | |
|---|---|
| H02K 15/00 | (2006.01) |
| B21F 1/00 | (2006.01) |
| H02K 1/16 | (2006.01) |
| H02K 3/12 | (2006.01) |
| H02K 3/48 | (2006.01) |
| H02K 15/06 | (2006.01) |

(52) U.S. Cl.
CPC ........... *H02K 15/0081* (2013.01); *B21F 1/00* (2013.01); *H02K 1/16* (2013.01); *H02K 3/12* (2013.01); *H02K 3/48* (2013.01); *H02K 15/0031* (2013.01); *H02K 15/062* (2013.01)

(58) Field of Classification Search
CPC ............ H02K 15/0081; H02K 15/062; H02K 15/0031
See application file for complete search history.

(56) References Cited

U.S. PATENT DOCUMENTS

| | | | |
|---|---|---|---|
| 2015/0074985 A1 | 3/2015 | Ohno et al. | |
| 2019/0190359 A1 | 6/2019 | Miyawaki et al. | |
| 2019/0245417 A1 | 8/2019 | Okuda et al. | |
| 2022/0385150 A1* | 12/2022 | Bäder | ............... H02K 15/0081 |

FOREIGN PATENT DOCUMENTS

| | | |
|---|---|---|
| JP | 2005324211 A | 11/2005 |
| JP | 2009065733 A | 3/2009 |
| JP | 2014075952 A | 4/2014 |
| JP | 2015061389 A | 3/2015 |
| JP | 2016131453 A | 7/2016 |
| JP | 2019050677 A | 3/2019 |
| JP | 2019140732 A | 8/2019 |

* cited by examiner

*Primary Examiner* — Livius R. Cazan
(74) *Attorney, Agent, or Firm* — CKC & Partners Co., LLC

(57) ABSTRACT

A wire position correction apparatus 14 corrects, in a stator 2 including an annular stator core 21 formed with a plurality of slots and a plurality of wires arranged in the slots, a tip end position of a wire leg portion 261 of the wire protruding from the slot to a reference position. The wire position correction apparatus 14 includes a wire clamper 4 that holds a tip end portion 263 of the wire leg portion 261, a turning mechanism 5 that supports the wire clamper 4 and turns the wire clamper 4 about a center axis passing through a base point P such that the tip end position moves in a direction approaching the reference position, and a movement mechanism 6 that moves the wire clamper 4 and the turning mechanism 5 along the vertical direction and circumferential and radial directions of the stator core 21.

10 Claims, 15 Drawing Sheets

FIG. 2
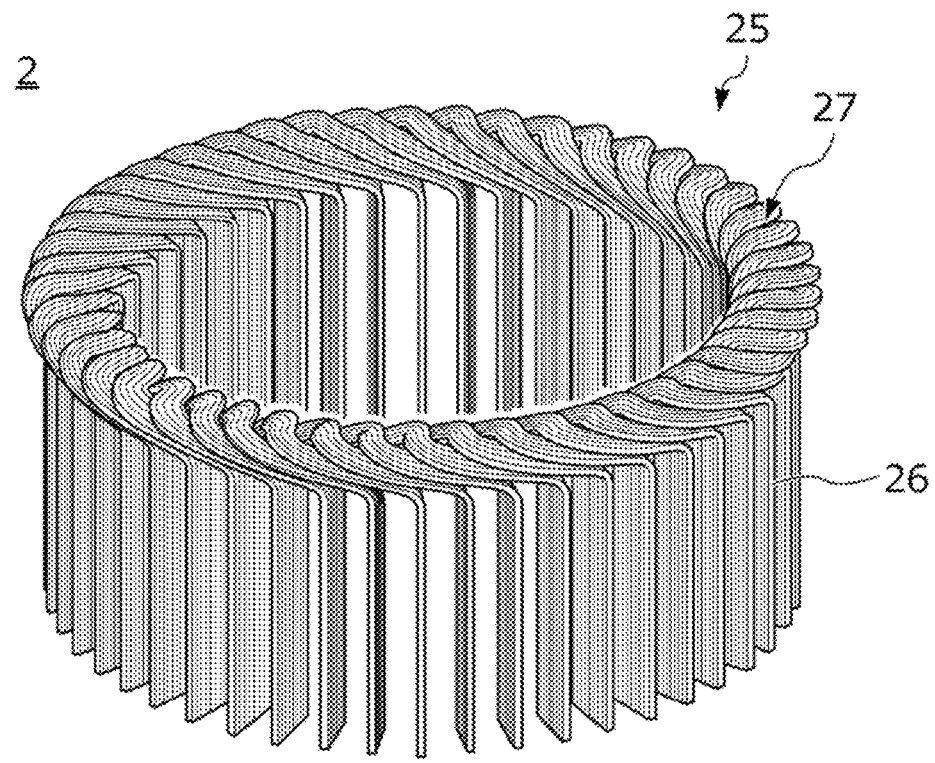
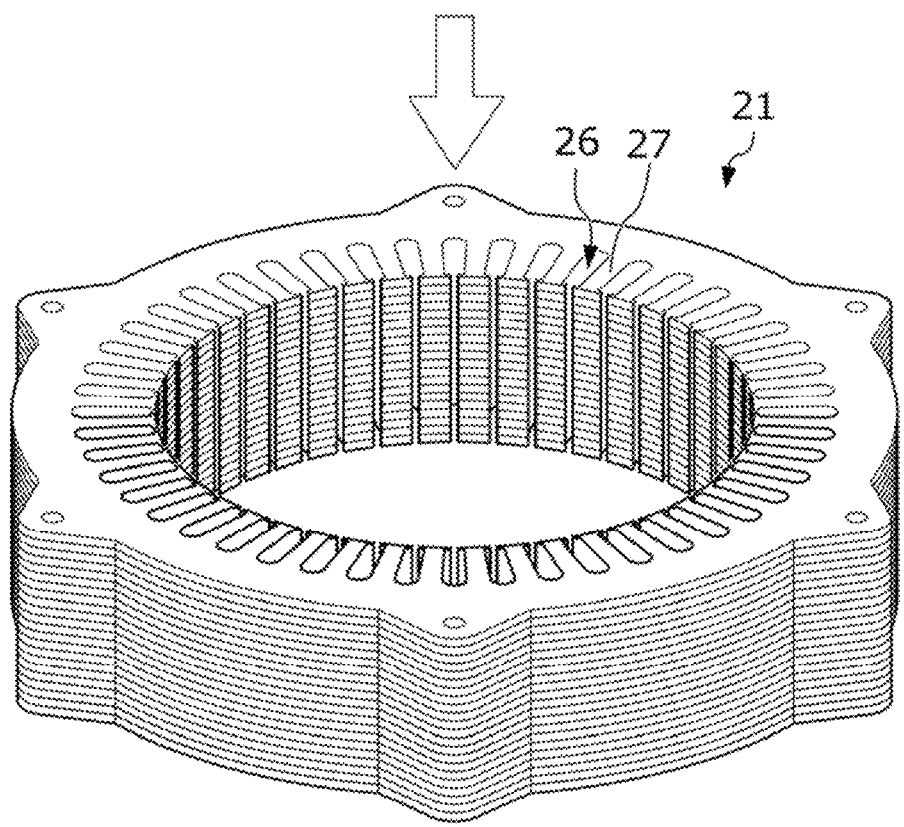

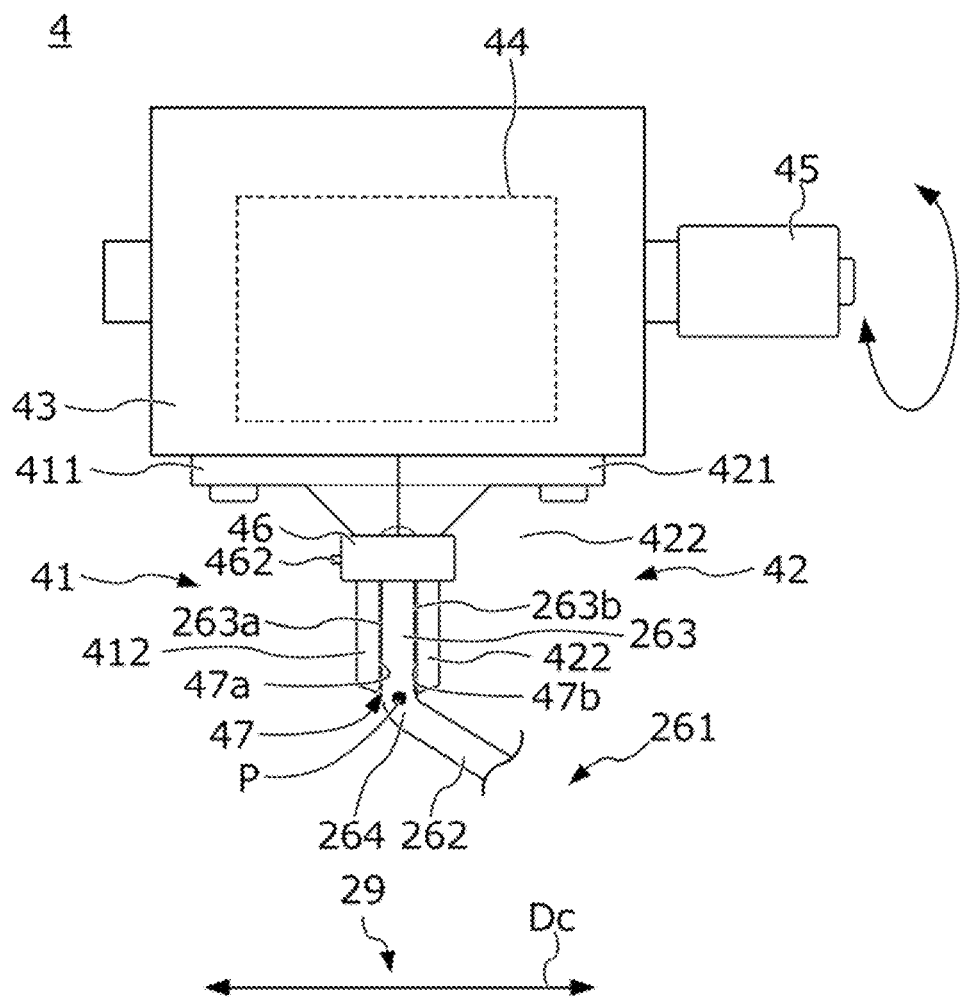

FIG. 10B

| | 1T | 2T | 3T | 4T | 5T | 6T | 7T | 8T |
|---|---|---|---|---|---|---|---|---|
| SHIFT DIRECTION | — | CCW | CCW | CW | CCW | CW | CW | CW |
| SHIFT AMOUNT | 0 | a2 | a3 | a4 | a5 | a6 | a7 | a8 |

SLOT NUMBER: 55

OK  NG

ARITHMETIC PROCESSING

| CORRECTION DIRECTION | CORRECTION ANGLE |
|---|---|
| CW | 2.152° |

101 — SLOT NUMBER
102 — (table)
103 — ARITHMETIC PROCESSING
104 — (correction table)

WIRE POSITION CORRECTION METHOD AND WIRE POSITION CORRECTION APPARATUS

This application is based on and claims the benefit of priority from Japanese Patent Application No. 2020-047192, filed on 18 Mar. 2020, the content of which is incorporated herein by reference.

BACKGROUND OF THE INVENTION

Field of the Invention

The present invention relates to a wire position correction method and a wire position correction apparatus. More specifically, the present invention relates to a wire position correction method and a wire position correction apparatus for a stator including an annular stator core and a plurality of wires arranged in slots formed at the stator core.

Related Art

A rotating machine such as an electric motor or an electric generator includes a stator and a rotor. The stator of the rotating machine is manufactured by the following steps, for example.

First, a plurality of wires as electric conductors is formed in a substantially U-shape, thereby producing a plurality of coil elements. Next, the plurality of produced coil elements is aligned in a circular ring shape while being stacked on each other in a circumferential direction, and in this state, a tip end portion of each wire is inserted into a corresponding one of slots formed at a circular ring-shaped stator core. Next, by a torsion bending apparatus, the tip end portions of the plurality of wires protruding from the slots are twisted and bent in the circumferential direction. Thereafter, adjacent ones of the tip end portions are joined to each other by welding, and in this manner, a stator is manufactured.

At the steps of manufacturing the stator as described above, there is, to no small extent, variation in the position of the tip end portion after torsion bending. For this reason, in some cases, joint failure might be caused. In a stator manufacturing method described in Japanese Unexamined Patent Application, Publication No. 2016-131453, a rod-shaped tool contacts, along a radial direction of a stator core, a tip end portion of a wire after torsion bending. In this manner, such a tip end portion is pushed and bent such that adjacent ones of the tip end portions contact each other. This prevents joint failure.

Patent Document 1: Japanese Unexamined Patent Application, Publication No. 2016-131453

SUMMARY OF THE INVENTION

However, in the manufacturing method of Japanese Unexamined Patent Application, Publication No. 2016-131453, the tool contacts the tip end portion of the wire. For this reason, the wire is bent at a slot-side base, a return range of the tip end portion due to spring back is great, and a tip end position cannot be corrected with favorable accuracy. Moreover, the plurality of wires is densely arranged in the slot. For this reason, there is a probability that when the wires are bent at the bases as in the manufacturing method of Japanese Unexamined Patent Application, Publication No. 2016-131453, not only the wire whose tip end position is to be corrected but also the position of the wire adjacent thereto are shifted.

An object of the present invention is to provide a wire position correction method and a wire position correction apparatus for a stator, the method and the apparatus being configured so that a tip end position of a target wire can be corrected with favorable accuracy.

(1) The wire position correction method according to the present invention is the method for correcting, in a stator (e.g., a later-described stator 2) including an annular stator core (e.g., a later-described stator core 21) formed with a plurality of slots (e.g., later-described slots 22) and a plurality of wires (e.g., later-described wires 26) arranged in the slots, a tip end position of a wire leg portion (e.g., a later-described wire leg portion 261) of one of the wires protruding from a corresponding one of the slots to a reference position. The method includes the step of holding, by a holding apparatus (e.g., a later-described wire clamper 4), a tip end portion (e.g., a later-described tip end portion 263) of the wire leg portion on a tip end side with respect to a bent portion (e.g., a later-described bent portion 264), and the step of turning the holding apparatus about a center axis (e.g., a later-described center axis 53*a*) passing through the bent portion or a base point (e.g., a later-described base point P) on a tip end portion side with respect to the bent portion such that the tip end position moves in a direction (e.g., a later-described correction direction) approaching the reference position, thereby bending the wire leg portion.

(2) In this case, the wire position correction method preferably further includes the step of calculating a turning angle of the holding apparatus necessary for correcting the tip end position to the reference position at the bending step based on a correlation between the turning angle about the center axis and a tip end position movement amount taking spring back of the wire leg portion after bending into consideration.

(3) In this case, the holding apparatus preferably includes a divided claw (e.g., later-described divided claws 41, 42) extending along both side portions (e.g., later-described side portions 263*a*, 263*b*) of the tip end portion. At the holding step, the divided claw is preferably inserted along the direction of the tip end portion.

(4) In this case, the holding apparatus preferably includes a chuck mechanism (e.g., a later-described chuck mechanism 44) that changes the width of the divided claw. At the holding step, after the tip end portion has been inserted into the divided claw in a state in which the claw width is increased, the claw width is decreased such that the divided claw holds the tip end portion.

(5) In this case, the wire leg portion preferably includes, in this order from a slot side to the tip end portion side as viewed along a radial direction of the stator core, an inclined portion (e.g., a later-described inclined portion 262) inclined with respect to an axial direction of each slot and extending along a circumferential direction of the stator core and the tip end portion inclined with respect to the inclined portion and extending along the axial direction of each slot. At the holding step, the holding apparatus preferably sandwiches both side portions of the tip end portion along the circumferential direction to hold the tip end portion. At the bending step, the holding apparatus is preferably turned about the center axis.

(6) The wire position correction apparatus according to the present invention is a wire position correction apparatus (e.g., a later-described wire position correction apparatus 14) for correcting, in a stator (e.g., a later-described stator 2) including an annular stator core (e.g., a later-described stator core 21) formed with a plurality of slots and a plurality of wires (e.g., later-described wires 26) arranged in the slots, a tip end position of a wire leg portion (e.g., a later-described wire leg portion 261) of one of the wires protruding from a corresponding one of the slots to a reference position. The apparatus includes a holding apparatus (e.g., a later-described wire clamper 4) that holds a tip end portion (e.g., a later-described tip end portion 263) of the wire leg portion on a tip end side with respect to a bent portion (e.g., a later-described bent portion 264) and a turning mechanism (e.g., a later-described turning mechanism 5) that supports the holding apparatus and turns the holding apparatus about a center axis (e.g., a later-described center axis 53a) passing through the bent portion or a base point (e.g., a later-described base point P) on a tip end portion side with respect to the bent portion such that the tip end position moves in a direction approaching the reference position.

(7) In this case, the wire position correction apparatus preferably includes a turning angle calculation unit (e.g., a later-described computer 7) that calculates a turning angle of the holding apparatus necessary for correcting the tip end position to the reference position based on a correlation between the turning angle about the center axis and a tip end position movement amount taking spring back of the wire leg portion after bending into consideration.

(8) In this case, the wire position correction apparatus preferably further includes a table (e.g., a later-described table 3) supporting the stator in a state in which the wire leg portion faces up in the vertical direction and a movement mechanism (e.g., a later-described movement mechanism 6) that moves the holding apparatus and the turning mechanism on the table along the vertical direction, a circumferential direction of the stator core, and a radial direction of the stator core.

(9) In this case, the holding apparatus preferably includes a divided claw (e.g., later-described divided claws 41, 42) extending along both side portions (e.g., later-described side portions 263a, 263b) of the tip end portion and a chuck mechanism (e.g., a later-described chuck mechanism 44) that changes the width of the divided claw.

(10) In this case, the wire leg portion preferably includes, in this order from a slot side to the tip end portion side as viewed along the radial direction of the stator core, an inclined portion (e.g., a later-described inclined portion 262) inclined with respect to an axial direction of each slot and extending along the circumferential direction of the stator core and the tip end portion inclined with respect to the inclined portion and extending along the axial direction of each slot. The holding apparatus preferably sandwiches both side portions (e.g., later-described side portions 263a, 263b) of the tip end portion along the circumferential direction to hold the tip end portion. The turning mechanism preferably turns the holding apparatus about the center axis.

(1) In the present invention, the tip end portion of the wire leg portion protruding from the slot of the stator core is held by the holding apparatus, and the holding apparatus is turned about the center axis passing through the bent portion or the base point on the tip end portion side with respect to the bent portion such that the tip end position of the wire leg portion moves in the direction approaching the reference position. In this manner, the wire leg portion is bent. According to the present invention, the tip end position can approach the reference position without the need for shifting the position of a slot-side portion of the wire leg portion with respect to the base point or bending such a portion. Thus, as compared to the case in which a base of a wire leg portion is bent as in a typical case, a return range of the tip end portion due to the spring back after bending can be narrowed. With this configuration, the tip end position of the target wire leg portion can be corrected with favorable accuracy.

(2) In the present invention, the turning angle necessary for correcting the tip end position to the reference position at the bending step is calculated based on the correlation between the turning angle of the holding apparatus about the center axis and the tip end position movement amount taking the spring back of the wire leg portion after bending into consideration. With this configuration, the tip end position of the target wire leg portion can be corrected with favorable accuracy.

(3) In the present invention, at the step of holding the tip end portion of the wire, the divided claw extending along both side portions of the tip end portion is inserted along the direction of the tip end portion. With this configuration, when the tip end portion is inserted into the divided claw, the probability of the position of the target wire leg portion being shifted or the target wire leg portion being bent due to contact of the divided claw with the tip end portion can be prevented. With this configuration, the tip end position of the target wire leg portion can be corrected with favorable accuracy.

(4) In the present invention, one including the chuck mechanism that changes the width of the divided claw is used as the holding apparatus. At the step of holding the tip end portion, the tip end portion has been inserted into the divided claw in a state in which the claw width is increased, and thereafter, the claw width is decreased such that the divided claw holds the tip end portion. Thus, when the divided claw is turned about the center axis to bend the wire leg portion, the probability of the tip end portion of the wire leg portion being shifted from the divided claw and the wire leg portion being bent at an unintended portion can be prevented. With this configuration, the tip end position of the target wire leg portion can be corrected with favorable accuracy.

(5) At the torsion bending step performed in advance of the wire position correction method according to the present invention, the wire protruding from the slot is twisted and bent. In this manner, the wire leg portion including the inclined portion inclined with respect to the axial direction of the slot and the tip end portion extending along the axial direction of the slot is formed. At the step of holding the tip end portion, the holding apparatus sandwiches both side portions of the tip end portion along the circumferential direction to hold the tip end portion. At the step of bending the wire leg portion, the holding apparatus is turned about the center axis, i.e., the axis perpendicular to the above-described circumferential direction, to bend the wire leg portion. With this configuration, misalignment of the tip end portion along the circumferential direction upon torsion bending can be corrected.

(6) The wire position correction apparatus according to the present invention includes the holding apparatus that holds the tip end portion of the wire leg portion protruding from the slot of the stator core and the turning mechanism that supports the holding apparatus and turns the holding apparatus about the center axis passing through the bent portion or the base point on the tip end portion side with respect to the bent portion such that the tip end position of the wire leg portion moves in the direction approaching the reference position. According to the present invention, the holding apparatus is turned by the turning mechanism in a state in which the tip end portion of the wire leg portion is held by the holding apparatus, thereby bending the wire leg portion. Thus, the tip end position can approach the reference position without the need for shifting the position of the slot-side portion of the wire leg portion with respect to the base point or bending such a portion. Consequently, as compared to the case in which the base of the wire leg portion is bent as in the typical case, the return range of the tip end portion due to the spring back after bending can be narrowed. With this configuration, the tip end position of the target wire leg portion can be corrected with favorable accuracy.

(7) The wire position correction apparatus according to the present invention includes the turning angle calculation unit that calculates the turning angle necessary for correcting the tip end position to the reference position based on the correlation between the turning angle of the holding apparatus about the center axis and the tip end position movement amount taking the spring back of the wire leg portion after bending into consideration. According to the present invention, the holding apparatus is turned by the turning angle calculated by the turning angle calculation unit. Thus, the tip end position can be corrected with favorable accuracy, considering the spring back of the wire leg portion after bending.

(8) The wire position correction apparatus according to the present invention includes the table supporting the stator in a state in which the wire leg portion faces up in the vertical direction and the movement mechanism that moves the holding apparatus and the turning mechanism on the table along the vertical direction, the circumferential direction, and the radial direction. According to the present invention, when the tip end portion of the wire leg portion is held by the holding apparatus, the holding apparatus can approach the tip end portion of the wire leg portion while the turning angle of the holding apparatus and the position of the holding apparatus along the vertical direction, the circumferential direction, and the radial direction are being finely adjusted. With this configuration, when the holding apparatus approaches the tip end portion, the probability of the position of the target wire leg portion being shifted or the target wire leg portion being bent due to contact of the holding apparatus with the tip end portion can be prevented. Thus, the tip end position of the target wire leg portion can be corrected with favorable accuracy.

(9) In the wire position correction apparatus according to the present invention, one including the divided claw extending along both side portions of the tip end portion and the chuck mechanism that changes the width of the divided claw is used as the holding apparatus. With this configuration, after the tip end portion has been inserted into the divided claw in a state in which the claw width is increased, the claw width is decreased so that the tip end portion can be held by the divided claw. Thus, when the divided claw is turned about the center axis to bend the wire leg portion, the probability of the tip end portion of the wire leg portion being shifted from the divided claw and the wire leg portion being bent at an unintended portion can be prevented. Consequently, the tip end position of the target wire leg portion can be corrected with favorable accuracy.

(10) At the torsion bending step performed before correction of the tip end position of the wire, the wire protruding from the slot is twisted and bent. In this manner, the wire leg portion including the inclined portion inclined with respect to the axial direction of the slot and the tip end portion extending along the axial direction of the slot is formed. The holding apparatus sandwiches both side portions of the tip end portion along the circumferential direction, thereby holding the tip end portion. The turning mechanism turns the holding apparatus about the center axis. According to the present invention, the holding apparatus is turned about the center axis passing through the base point and extending perpendicularly to the above-described circumferential direction, thereby bending the wire leg portion. Thus, misalignment of the tip end portion along the circumferential direction upon torsion bending can be corrected.

BRIEF DESCRIPTION OF THE DRAWINGS

FIG. 2 is a view showing configurations of a stator core and a coil;

FIG. 8 is a view showing a state in which a tip end portion of a wire leg portion is held by the wire clamper;

FIG. 10B is a view showing one example of a detailed screen after selection of a slot number;

DETAILED DESCRIPTION OF THE INVENTION

Hereinafter, a wire position correction apparatus according to one embodiment of the present invention and a wire position correction method using this wire position correction apparatus will be described with reference to the drawings.

Figure 1:
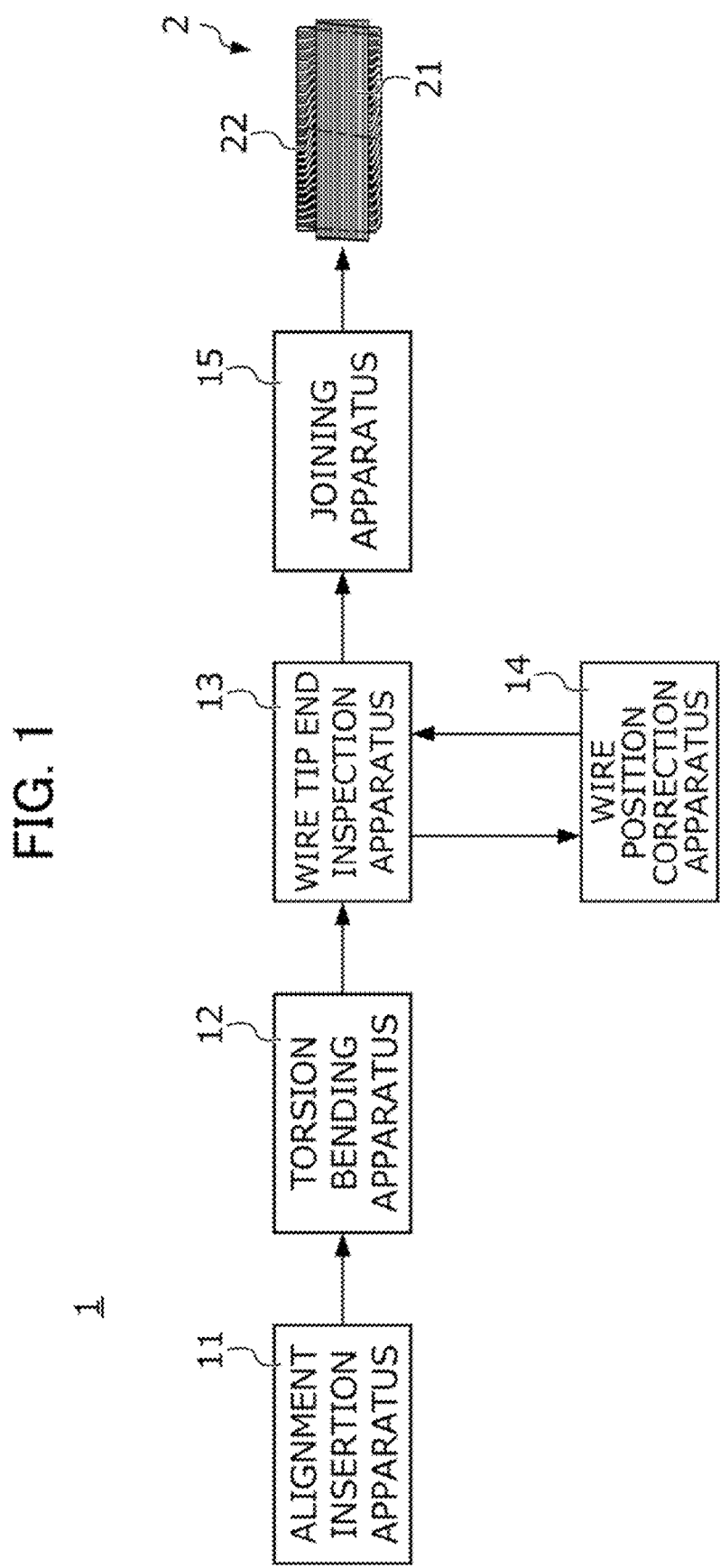
FIG. 1 is a diagram showing part of a stator manufacturing apparatus into which a wire position correction apparatus according to one embodiment of the present invention is incorporated.

FIG. 1 is a diagram showing part of an apparatus 1 for manufacturing a stator used for a rotating machine such as an electric motor or an electric generator. The stator manufacturing apparatus 1 includes an alignment insertion apparatus 11, a torsion bending apparatus 12, a wire tip end inspection apparatus 13, a wire position correction apparatus 14, and a joining apparatus 15. A stator 2 including a stator core 21 and a coil 25 is manufactured through processing and inspection by the above-described apparatuses 11 to 15.

As shown in FIG. 2, the alignment insertion apparatus 11 attaches the coil 25 prepared in advance to the stator core 21 prepared in advance.

The stator core 21 is in a hollow circular columnar shape extending along an axial direction, and is in a circular ring shape as viewed in plane. The stator core 21 is configured such that a plurality of circular ring-shaped copper plates is stacked on each other. A plurality of slots 22 penetrating an inner peripheral portion of the stator core 21 along the axial direction is formed at equal intervals along a circumferential direction. Of the stator core 21, a portion between adjacent ones of the slots 22 is a tooth portion 23. The coil 25 includes a plurality of coil elements 27 formed in such a manner that wires 26 as a plurality of electric conductors are bundled into a substantially U-shape. Top portions of the plurality of coil elements 27 are formed in a substantially S-shape as viewed in plane.

The alignment insertion apparatus 11 inserts, in a state in which the plurality of coil elements 27 is aligned in a circular ring shape to overlap with each other in the circumferential direction, a tip end portion 263 of each wire 26 into a corresponding one of the slots 22 formed at the stator core 21 such that the tip end portion 263 protrudes from the slot 22.

Note that FIGS. 1 to 4 show a case where the number (hereinafter also referred to as a "slot number") of slots 22 formed at the stator core 21 is 48 and the number (hereinafter also referred to as a "turn number") of wires 26 arranged in the single slot 22 is 8, but the slot and turn numbers of the stator 2 are not limited to these numbers.

Figure 3:
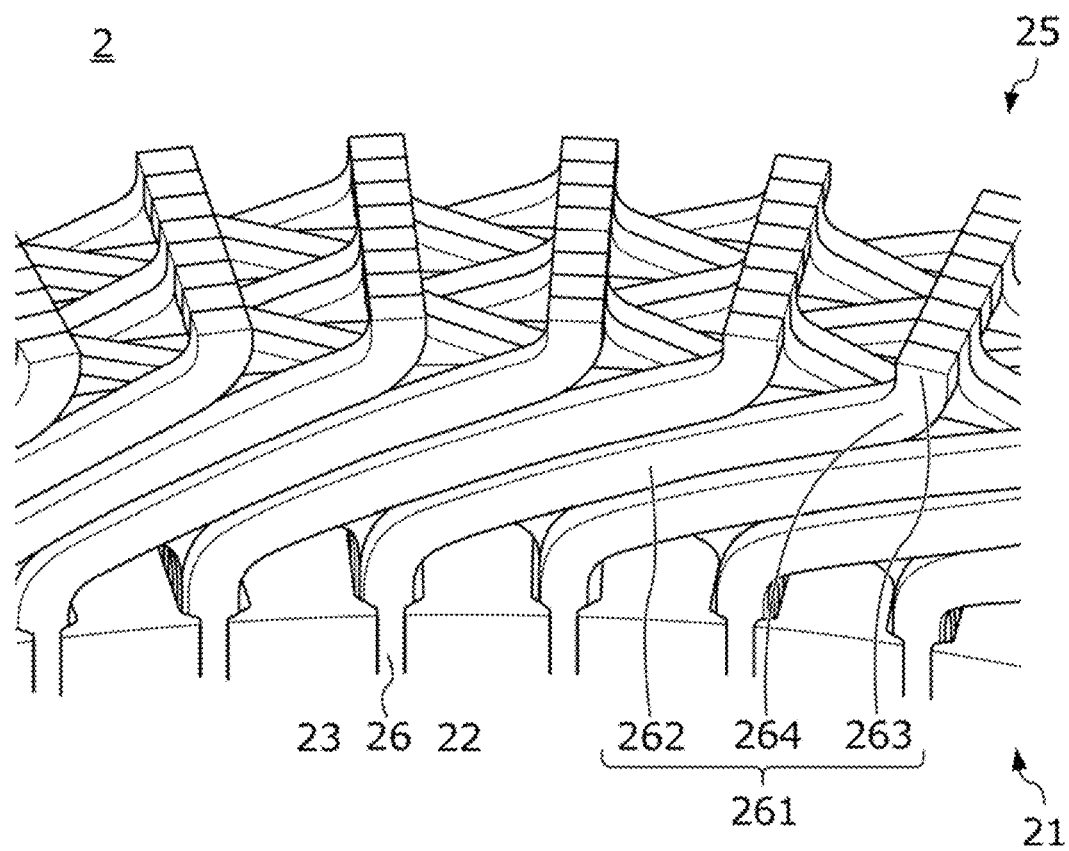
FIG. 3 is a view showing a configuration of the stator after torsion bending by a torsion bending apparatus.

The torsion bending apparatus 12 twists and bends the plurality of wires 26 arranged in the slots 22 of the stator 2 after processing by the alignment insertion apparatus 11. In such torsion bending, a wire leg portion 261 as a portion of the wire 26 protruding from the slot 22 is twisted and bent in the circumferential direction of the stator core 21 as shown in FIG. 3. More specifically, in torsion bending, the wire leg portion 261 of the first turn from the inside of the stator core 21 in a radial direction is twisted and bent to one side (the right side in an example of FIG. 3) in the circumferential direction, the wire leg portions 261 of the second and third turns are twisted and bent to the other side (the left side in the example of FIG. 3) in the circumferential direction, the wire leg portions 261 of the fourth and fifth turns are twisted and bent to one side in the circumferential direction, the wire leg portions 261 of the sixth and seventh turns are twisted and bent to the other side in the circumferential direction, and the wire leg portion 261 of the eighth turn is twisted and bent to one side in the circumferential direction. Moreover, in torsion bending, the tip end portion 263 of each wire leg portion 261 twisted and bent as described above is twisted and bent to the opposite side such that the tip end portion 263 is substantially parallel with the axial direction of the stator core 21. Note that FIG. 3 shows a case where the second and third turns are twisted and bent in the same direction, the fourth and fifth turns are twisted and bent in the same direction, and the sixth and seventh turns are twisted and bent in the same direction, but the direction of twisting and bending each turn is not limited to such a direction.

As shown in FIG. 3, the wire leg portion 261 of the stator 2 after torsion bending by the torsion bending apparatus 12 includes, in this order from a slot 22 side to a tip end portion 263 side as viewed along the radial direction of the stator core 21, an inclined portion 262 inclined with respect to the axial direction of the slot 22 and extending along the circumferential direction of the stator core 21, the tip end portion 263 inclined with respect to the inclined portion 262 and extending along the axial direction of the slot 22, and a bent portion 264 curved along the circumferential direction and connecting the inclined portion 262 and the tip end portion 263 to each other. With this configuration, the tip end portions 263 of the wires 26 of the stator 2 after torsion bending as described above are arranged in line along the radial direction as shown in FIG. 3 if torsion bending is performed properly.

The wire tip end inspection apparatus 13 inspects whether or not the tip end portion 263 of each wire 26 is arranged at a proper position in the stator 2 after torsion bending by the torsion bending apparatus 12. More specifically, the wire tip end inspection apparatus 13 captures, for each slot 22, an inspection image of the tip end portion 263 of each wire 26 of the stator 2 along the axial direction of the stator core 21 by means of a not-shown camera, and based on the captured inspection image, inspects whether or not the tip end portion 263 is arranged at the proper position.

Figure 4:
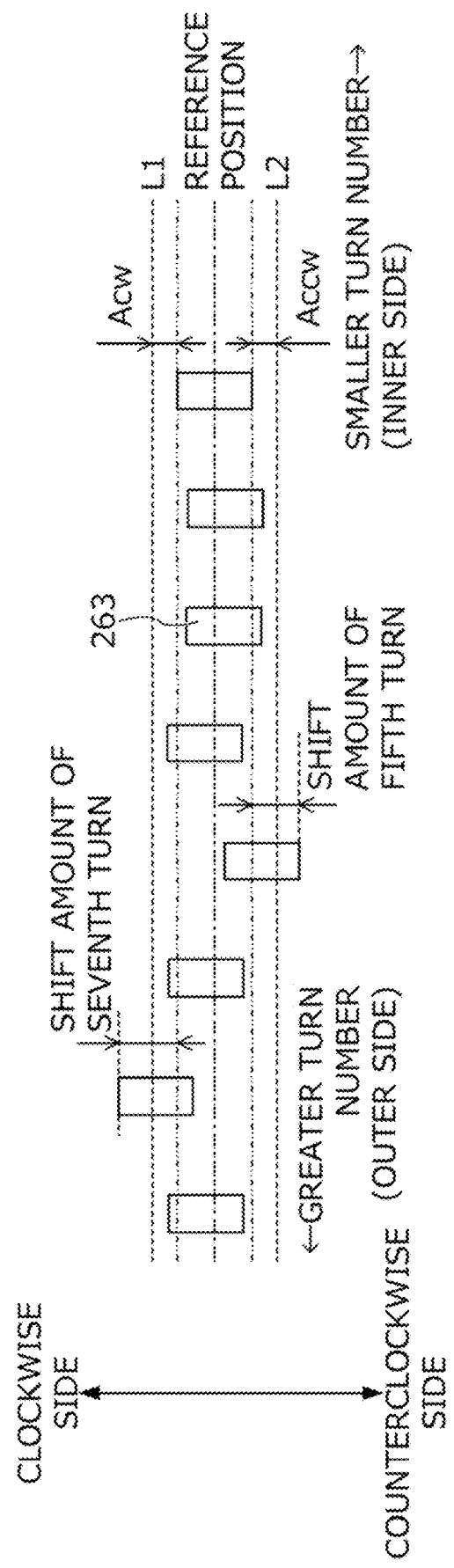
FIG. 4 is a view showing one example of an inspection image captured by a wire tip end inspection apparatus.

FIG. 4 is a view showing one example of the inspection image captured by the wire tip end inspection apparatus 13. In FIG. 4, a reference position corresponding to a proper position of the center of each tip end portion 263 is indicated by a chain line. Moreover, in FIG. 4, the right side is an inner side in the radial direction, and the left side is an outer side in the radial direction. The wire tip end inspection apparatus 13 determines, based on the captured inspection image, whether or not both end surfaces of the tip end portion 263 of each turn along the circumferential direction are within an area between a threshold L1 set on a clockwise side in the circumferential direction with respect to the reference position and a threshold L2 set on a counterclockwise side in the circumferential direction, thereby inspecting whether or not the tip end portion 263 is arranged at the proper position.

Note that the center position of the tip end portion 263 of each turn along the circumferential direction will be hereinafter referred to as a tip end position. Moreover, a case where the tip end position of the first turn present on the innermost side in the radial direction is taken as the reference position will be described below, but the present invention is not limited to such a case. The tip end position of the turn other than the first turn may be taken as the reference position, or a preset position may be taken as the reference position.

Note that FIG. 4 shows a case where the tip end position of the first turn is taken as the reference position, the tip end positions of the second and third turns are slightly shifted counterclockwise in the circumferential direction with respect to the reference position, and the tip end positions of the fourth, sixth, and eighth turns are slightly shifted clockwise in the circumferential direction with respect to the reference position.

Moreover, FIG. 4 shows a case where the tip end position of the fifth turn is greatly shifted counterclockwise in the circumferential direction with respect to the reference position and the tip end position of the seventh turn is greatly shifted clockwise in the circumferential direction with respect to the reference position. More specifically, FIG. 4 shows a case where the position of the end surface of the tip end portion 263 of the fifth turn on the counterclockwise side in the circumferential direction is beyond the threshold L2 and the position of the end surface of the tip end portion 263 of the seventh turn on the clockwise side in the circumferential direction is beyond the threshold L1. Thus, the tip end position of the fifth turn needs to be moved clockwise in the circumferential direction toward the reference position, and the tip end position of the seventh turn needs to be moved counterclockwise in the circumferential direction toward the reference position.

The wire tip end inspection apparatus 13 calculates, based on the captured inspection image, the direction of shift of the tip end position of each turn with respect to the reference position and the amount of shift of the tip end position of each turn with respect to the reference position. In a case where the tip end position is shifted clockwise in the circumferential direction with respect to the reference position, the wire tip end inspection apparatus 13 compares the shift amount with a threshold Acw (a clearance between the threshold L1 and the position of the end surface, which is on the clockwise side in the circumferential direction, of the tip end portion 263 present at the reference position). In a case where the shift amount does not exceed the threshold Acw, the wire tip end inspection apparatus 13 determines that the tip end portion 263 is arranged at the proper position. In a case where the shift amount exceeds the threshold Acw, the wire tip end inspection apparatus 13 determines that the tip end portion 263 is not arranged at the proper position. In a case where the tip end position is shifted counterclockwise in the circumferential direction with respect to the reference position, the wire tip end inspection apparatus 13 compares the shift amount with a threshold Accw (a clearance between the threshold L2 and the position of the end surface, which is on the counterclockwise side in the circumferential direction, of the tip end portion 263 present at the reference position). In a case where the shift amount does not exceed the threshold Accw, the wire tip end inspection apparatus 13 determines that the tip end portion 263 is arranged at the proper position. In a case where the shift amount exceeds the threshold Accw, the wire tip end inspection apparatus 13 determines that the tip end portion 263 is not arranged at the proper position. Thus, the shift amount calculated as described above is equivalent to a distance, for arranging the tip end portion 263 at the proper position, the tip end position thereof needs to be moved along the circumferential direction.

The wire tip end inspection apparatus 13 performs, for each slot 22, inspection based on the inspection image as described above, and in a case where the wire tip end inspection apparatus 13 determines for all slots 22 that the tip end portions 263 of all turns are arranged at the proper positions, sends the stator 2 to the joining apparatus 15 after such an inspection. Moreover, in a case where the tip end portion 263 not arranged at the proper position is present in any one of all slots 22, the wire tip end inspection apparatus 13 sends, together with necessary data, the stator 2 to the wire position correction apparatus 14 after such an inspection. The data transmitted from the wire tip end inspection apparatus 13 to the wire position correction apparatus 14 as described herein includes, for example, the shift direction and amount of each turn and the slot and turn numbers of the tip end portion 263 not arranged at the proper position.

The wire position correction apparatus 14 corrects, based on the information transmitted from the wire tip end inspection apparatus 13, the tip end position of the wire 26 of the stator 2 sent from the wire tip end inspection apparatus 13. The stator 2 whose tip end position has been corrected by the wire position correction apparatus 14 is again sent to the wire tip end inspection apparatus 13, and is inspected again. Note that this configuration of the wire position correction apparatus 14 will be described later in detail with reference to FIGS. 5 to 14, for example.

The joining apparatus 15 joins, by TIG welding, the tip end portions 263 of two adjacent wires 26 of the stator 2 after inspection by the wire tip end inspection apparatus 13, thereby forming the coil 25. The stator 2 is manufactured by the following steps.

Figure 5:
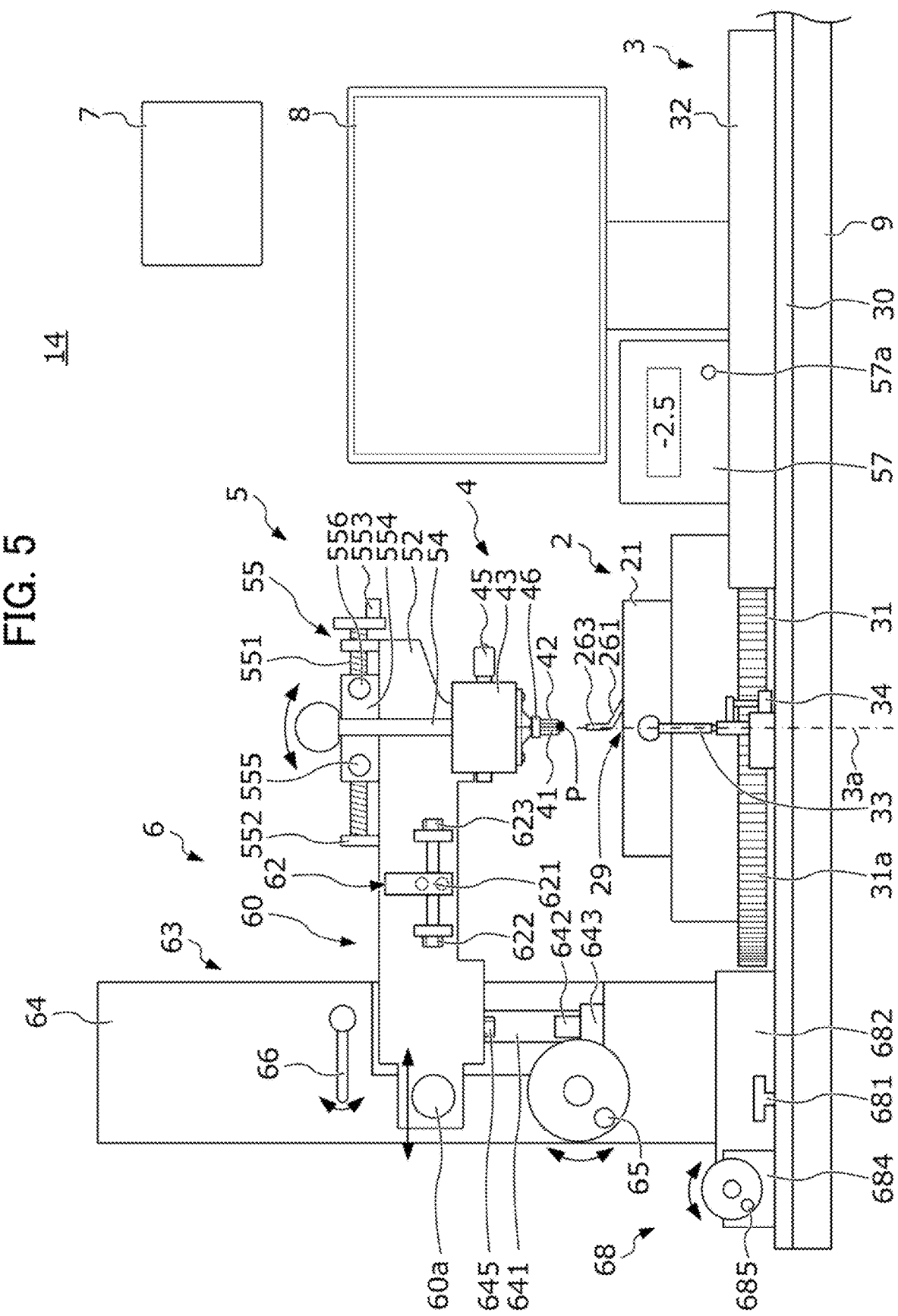
FIG. 5 is a front view of the wire position correction apparatus.
Figure 6:
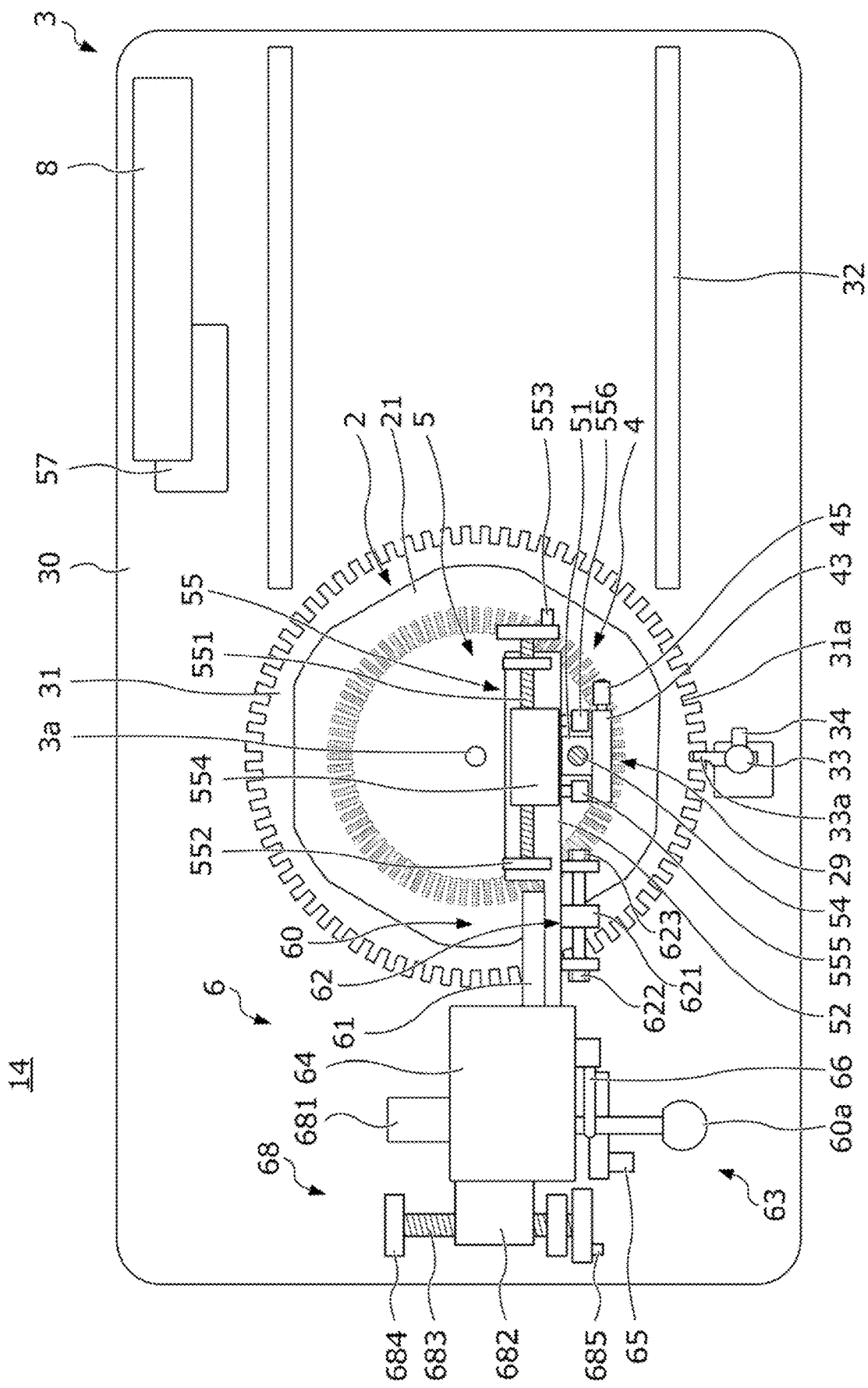
FIG. 6 is a plan view of the wire position correction apparatus.

FIG. 5 is a front view of the wire position correction apparatus 14 as viewed from an operator. (not shown) side, and FIG. 6 is a plan view of the wire position correction apparatus 14 as viewed from above in the vertical direction.

The wire position correction apparatus 14 includes a table 3 on which the stator 2 is mounted, a wire clamper 4 that holds the tip end portion 263 of the wire leg portion 261 on a tip end side with respect to the bent portion 264, a turning mechanism 5 supporting the wire clamper 4 such that the wire clamper 4 is turnable about a predetermined turning axis, a movement mechanism 6 supporting the wire clamper 4 and the turning mechanism 5 such that the wire clamper 4 and the turning mechanism 5 are movable along a predetermined direction, a computer 7 that performs arithmetic processing based on the information transmitted from the wire tip end inspection apparatus 13, a touch panel display 8 that displays the information transmitted from the wire tip end inspection apparatus 1:3, an arithmetic processing result from the computer 7, etc. in a form viewable by an operator, and a work table 9 provided with the table 3, the movement mechanism 6, and the touch panel display 8. Hereinafter, a case where the slot number of the stator 2 is 72 and the turn number of the stator 2 is 8 will be described, but the slot and turn numbers are not limited to these numbers. For the sake of easy understanding, FIG. 5 shows only one of the plurality (8×72) of wire leg portions 261 protruding from the stator core 21 of the stator 2, and FIG. 6 does not show the wire leg portions 261.

The table 3 includes a plate-shaped main table 30 provided on the work table 9, a turn table 31 supporting the stator 2, slide rails 32 that move the stator 2 sent from the wire tip end inspection apparatus 13 from the right side to the left side as viewed in FIG. 5 to mount the stator 2 on the turn table 31, and a slot position fixing lever 33 operable by the operator to fix the position of the turn table 31.

The turn table 31 is, as viewed in plane, in a discoid shape slightly larger than the stator 2. The turn table 31 supports the stator 2 in a state in which the wire leg portions 261 face up in the vertical direction. The turn table 31 is rotatable clockwise or counterclockwise about a rotary shaft 3a relative to the main table 30, the rotary shaft 3a extending along the vertical direction at a center portion of the turn table 31. The stator 2 is, with a not-shown positioning pin, fixed to the turn table 31 coaxially with the rotary shaft 3a of the turn table 31. As shown in FIG. 6, a plurality of grooves 31a is formed at an outer peripheral portion of the turn table 31. The number of grooves 31a is, for example, the same number as the slot number of the stator 2, i.e., 72. However, the present invention is not limited to such a number.

The slot position fixing lever 33 is, on the operator side with respect to the turn table 31 on the main table 30, provided turnably about a shaft member 34 extending along a tangential direction of the turn table 31. A spherical grip grippable by the operator is provided on a tip end side of the slot position fixing lever 33, and a claw 33*a* engaging with one of the plurality of grooves 31*a* formed at the turn table 31 is provided on a base end side of the slot position fixing lever 33. Thus, the operator raises the slot position fixing lever 33 as shown in FIG. 5 such that the claw 33*a* of the slot position fixing lever 33 engages with the groove 31*a* of the turn table 31, and in this manner, rotation of the turn table 31 and the stator 2 supported on the turn table 31 about the rotary shaft 3*a* is restricted. Moreover, the operator pulls the slot position fixing lever 33 to a near side to lower the slot position fixing lever 33, thereby detaching the claw 33*a* of the slot position fixing lever 33 from the groove 31*a* of the turn table 31. In this manner, the above-described restriction can be cancelled.

Note that one of the plurality of slots, which is provided at the stator 2 on the turn table 31, closest to the operator, i.e., one closest to the slot position fixing lever 33, will be hereinafter also referred to as a target slot 29. Thus, in FIGS. 5 and 6, the left side is the clockwise side of the target slot 29 in the circumferential direction, and the right side is the counterclockwise side of the target slot 29 in the circumferential direction.

Figure 7A:
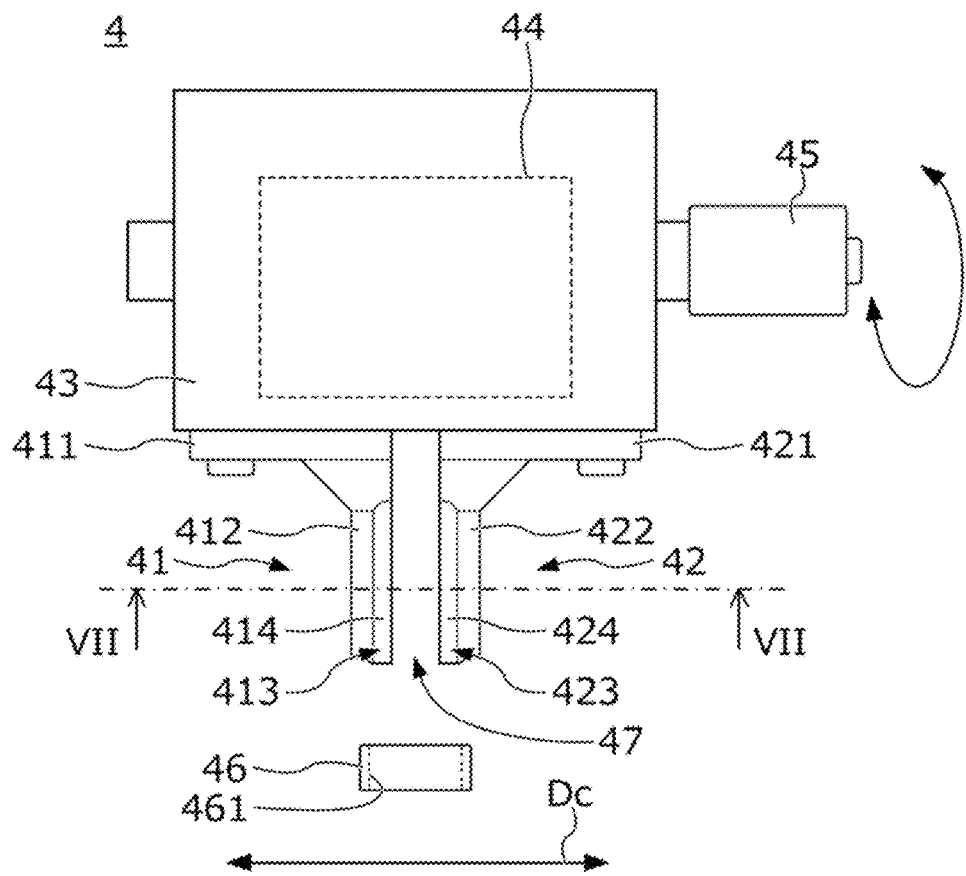
FIG. 7A is a front view of a wire clamper.
Figure 7B:
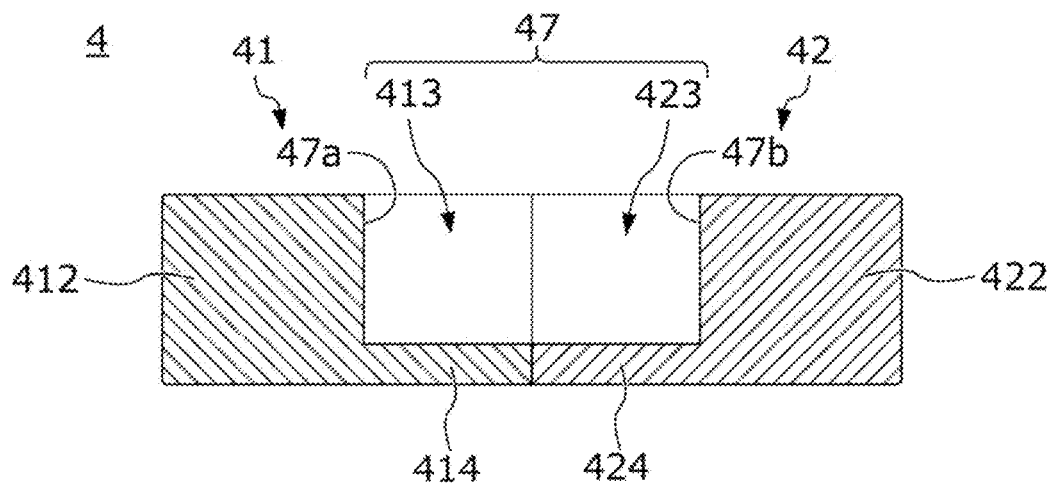
FIG. 7B is a sectional view of the wire clamper.

FIG. 7A is a front view of the wire clamper 4 as viewed from the operator side, and FIG. 7B is a sectional view of the wire clamper 4 along a line VII-VII in FIG. 7A. FIG. 8 is a view showing a state in which the wire clamper 4 holds the tip end portion 263 of the wire leg portion 261 present above the target slot 29 in the vertical direction.

The wire clamper 4 includes divided claws 41, 42 extending along both side portions 263*a*, 263*b* of the tip end portion 263 along the circumferential direction, a clamper body 43 slidably supporting these divided claws 41, 42 along a claw width direction Dc, a rod-shaped grip 45 rotatably operable by the operator, and a claw anti-opening ring 46 that prevents the divided claws 41, 42 from bending in the direction in which the width between the claws increases.

A chuck mechanism 44 that changes the width between the divided claws 41, 42 according to operation of the grip 45 by the operator is provided in the clamper body 43. The chuck mechanism 44 converts rotational motion of the grip 45 into linear motion of the divided claws 41, 42 along the claw width direction Dc, thereby changing the width between the divided claws 41, 42. More specifically, when the grip 45 is rotated forward by the operator, the chuck mechanism 44 causes the divided claws 41, 42 to approach each other along the claw width direction Dc to close the divided claws 41, 42. When the grip 45 is rotated backward by the operator, the chuck mechanism 44 separates the divided claws 41, 42 from each other along the claw width direction Dc to open the divided claws 41, 42.

One divided claw 41 includes a base end portion 411 and a rod-shaped claw portion 412 extending from the base end portion 411 in a direction perpendicular to the claw width direction Dc. On the inner side of the claw portion 412 along the claw width direction Dc, a cutout portion 413 and a back plate portion 414 extending along the direction of extension of the claw portion 412 are formed. The other divided claw 42 includes a base end portion 421 and a rod-shaped claw portion 422 extending from the base end portion 421 in the direction perpendicular to the claw width direction Dc. On the inner side of the claw portion 422 along the claw width direction Dc, a cutout portion 423 and a back plate portion 424 extending along the direction of extension of the claw portion 422 are formed.

Thus, as shown in FIG. 7B, the cutout portions 413, 423 form, between the claw portions 412, 422, a tip end housing portion 47 as a recessed groove for housing the tip end portion 263 of the wire leg portion 261. As shown in FIG. 8, the divided claws 41, 42 sandwich both side portions 263*a*, 263*b* of the tip end portion 263 between both inner wall surfaces 47*a*, 47*b* of the tip end housing portion 47 such that the tip end portion 263 of the wire leg portion 261 is housed in the tip end housing portion 47 and tip end portions of the divided claws 41, 42 contact a base (i.e., a boundary between the tip end portion 263 and the bent portion 264) of the tip end portion 263 of the wire leg portion 261, thereby holding the tip end portion 263.

The claw anti-opening ring 46 is in a columnar shape. A through-hole 461 extending along the direction perpendicular to the claw width direction Dc is formed in the claw anti-opening ring 46. As shown in FIG. 8, the claw anti-opening ring 46 is fixed to the divided claws 41, 42 in such a manner that the claw portions 412, 422 are inserted into the through-hole 461 in a state in which the divided claws 41, 42 are closed and a retaining pin 462 is further inserted. This prevents the divided claws 41, 42 from bending in the direction in which the width between the claws increases. Note that the width between the divided claws 41, 42 can be slightly changed even in a state in which the claw anti-opening ring 46 as described above is fixed to the divided claws 41, 42.

Figure 9:
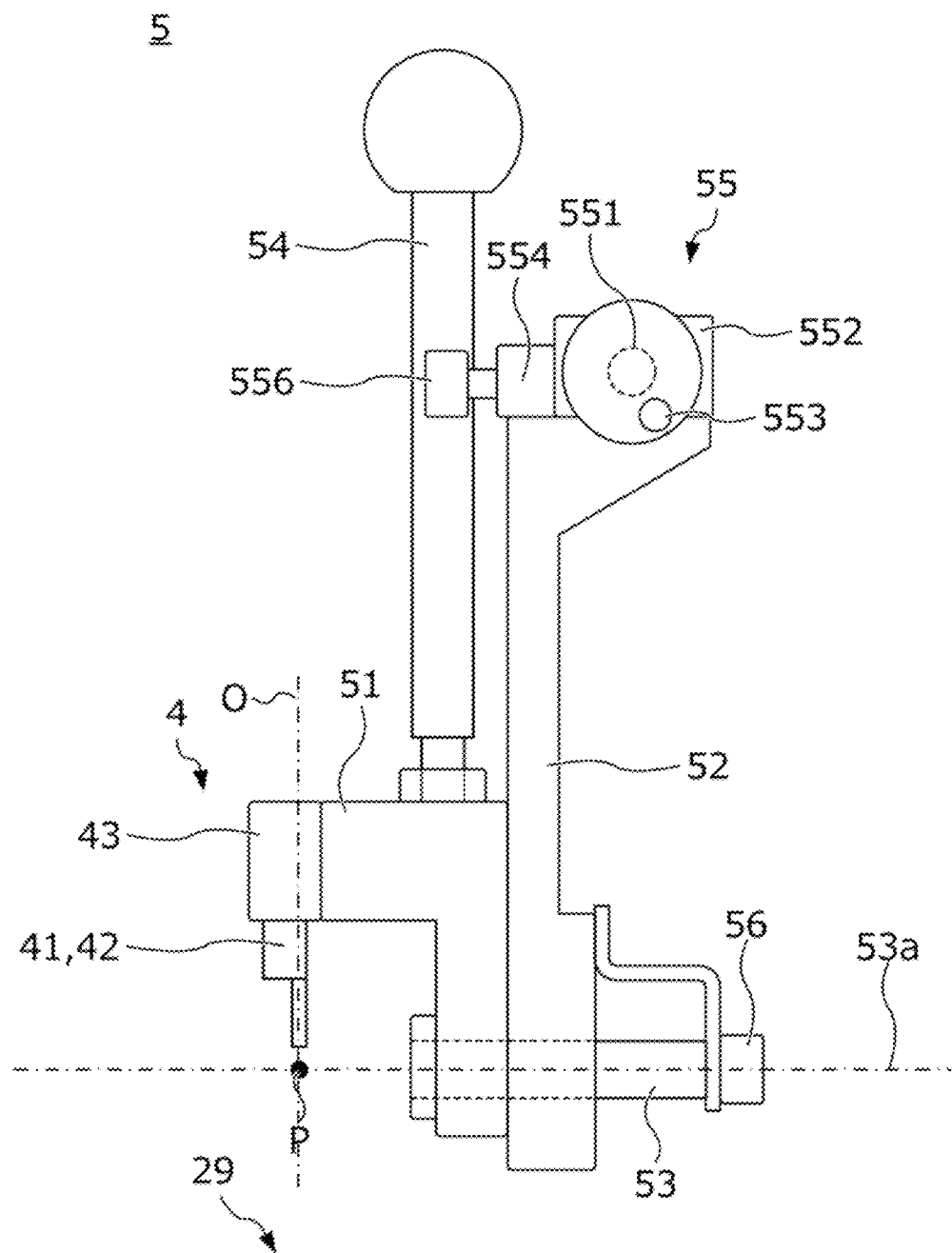
FIG. 9 is a side view of a turning mechanism.

Next, the configuration of the turning mechanism 5 will be described with reference to FIGS. 5 and 9. FIG. 9 is a side view of the turning mechanism 5. In FIG. 9, the left side is a front side facing the operator, and the right side is a back side.

The turning mechanism 5 includes a clamper bracket 51 supporting the clamper body 43 on the back side of the wire clamper 4, a turning mechanism body 52 supporting the clamper bracket 51 on the back side of the clamper bracket 51, a rotary shaft 53 coupling the clamper bracket 51 and the turning mechanism body 52, a claw angle operation lever 54 provided on the clamper bracket 51, a claw angle adjustment mechanism 55 provided on the turning mechanism body 52, and a claw angle sensor 56 provided on the back side of the turning mechanism body 52.

The clamper bracket 51 supports the back side of the clamper body 43 of the wire clamper 4 such that the tip end portions of the divided claws 41, 42 are positioned above the target slot 29 in the vertical direction.

The turning mechanism body 52 is in a plate shape extending along the vertical direction. The turning mechanism body 52 pivotally supports the clamper bracket 51 through the rotary shaft 53 provided below the turning mechanism body 52 in the vertical direction. That is, the clamper bracket 51 and the wire clamper 4 supported by the clamper bracket 51 are turnable about the rotary shaft 53 relative to the turning mechanism body 52.

The rotary shaft 53 extends along the radial direction of the stator core 21. More specifically, the center axis 53*a* of the rotary shaft 53 extends along the radial direction, and passes through the vicinity of the tip end portions of the divided claws 41, 42. More specifically, the center axis 53*a* passes through the tip end portions of the divided claws 41, 42 or a position slightly apart from the tip end portions of the divided claws 41, 42 along the direction of extension of the divided claws 41, 42. Hereinafter, an intersection between the center axis 53a and a virtual line O extending along the direction of extension of the divided claws 41, 42 and passing through the tip end portions of the divided claws 41, 42 will be referred to as a base point. P. Thus, the wire clamper 4 is, relative to the turning mechanism body 52, turnable about the center axis 53a passing through the base point P set to the vicinity of the tip end portions of the divided claws 41, 42. Thus, in a state in which the divided claws 41, 42 of the wire clamper 4 hold the tip end portion 263 of the wire leg portion 261 as shown in, e.g., FIG. 8, the wire clamper 4 can be turned about the center axis 53a passing through the base point P on the bent portion 264 to move the tip end position of the tip end portion 263 in a direction approaching the reference position.

Hereinafter, a turning angle of the wire clamper 4 about the rotary shaft 53, i.e., the angle of the divided claw 41, 42 about the center axis 53a, will be also referred to as a claw angle. Hereinafter, the counterclockwise side (the right side in FIG. 5, the near side in the plane of paper of FIG. 9) of the target slot 29 in the circumferential direction will be referred to as a claw angle positive side, and the clockwise side (the left side in FIG. 5, the far side in the plane of paper of FIG. 9) of the target slot 29 in the circumferential direction will be referred to as a claw angle negative side. That is, when the divided claws 41, 42 tilt to the right side as viewed from the operator side, the claw angle increases to the positive side. When the divided claws 41, 42 tilt to the left side as viewed from the operator side, the claw angle decreases to the negative side. Note that in the present embodiment, a case where the base point P is set to the position slightly apart from the tip end portions of the divided claws 41, 42 along the virtual line O as shown in FIG. 9 is described, but the present invention is not limited to such a case. The base point P may be set to a position on the tip end portions of the divided claws 41, 42.

The claw angle sensor 56 detects the claw angle with respect to a predetermined reference point. The value of the claw angle detected by the claw angle sensor 56 is displayed in the form viewable by the operator on a display 57 provided on the main table 30. Note that the display 57 is provided with a reset button 57a that resets the value of the claw angle to zero. That is, the display 57 displays the value of the claw angle in a case where the value of the claw angle when the reset button 57a is pressed for the last time is taken as zero.

The claw angle operation lever 54 is in a rod shape. As shown in FIG. 5, the claw angle operation lever 54 stands on the clamper bracket 51 coaxially with the divided claws 41, 42 as viewed from the operator side. Thus, the operator can turn the wire clamper 4 about the center axis 53a by tilting the claw angle operation lever 54 to the right side or the left side as viewed from the operator.

The claw angle adjustment mechanism 55 is provided above the turning mechanism body 52 in the vertical direction. The claw angle adjustment mechanism 55 includes a screw shaft 551 extending along the circumferential direction, bearings 552 rotatably supporting both end portions of the screw shaft 551, and a rotary handle 553 provided on the end portion of the screw shaft 551. A nut bracket 554 is screwed onto the screw shaft 551. Thus, when the operator rotates the rotary handle 553 forward or backward to rotate the screw shaft 551 forward or backward, the nut bracket 554 slides to the right side or the left side as viewed from the operator side.

As shown in FIG. 5, circular columnar stoppers 555, 556 extending along the radial direction are provided on both right and left end sides of the nut bracket 554 as viewed from the operator side. The above-described claw angle operation lever 54 is provided between the stoppers 555, 556. Thus, the operator can rotate the rotary handle 553 forward in a state in which the stopper 556 contacts the claw angle operation lever 54, thereby tilting the claw angle operation lever 54 clockwise in the circumferential direction to finely adjust the claw angle. Moreover, the operator can rotate the rotary handle 553 backward in a state in which the stopper 555 contacts the claw angle operation lever 54, thereby tilting the claw angle operation lever 54 counterclockwise in the circumferential direction to finely adjust the claw angle.

As shown in FIGS. 5 and 6, the movement mechanism 6 includes a circumferential movement mechanism 60 supporting the turning mechanism 5, a vertical movement mechanism 63 supporting the circumferential movement mechanism 60, and a radial movement mechanism 68 supporting the vertical movement mechanism 63. The movement mechanism 6 uses the circumferential movement mechanism 60, the vertical movement mechanism 63, and the radial movement mechanism 68, thereby supporting the wire clamper 4 and the turning mechanism 5 on the table 3 such that the wire clamper 4 and the wire clamper 4 are movable along the circumferential direction of the stator core 21, the vertical direction, and the radial direction of the stator core 21. Hereinafter, the configurations of the circumferential movement mechanism 60, the vertical movement mechanism 63, and the radial movement mechanism 68 will be described in this order.

The circumferential movement mechanism 60 includes a support plate 61 supporting the turning mechanism body 52 from the back side and a circumferential fixing mechanism 62 fixing the position of the turning mechanism body 52 with respect to the support plate 61.

A rail (not shown) extending along the right-left direction as viewed from the operator side, i.e., the direction tangential to the circumferential direction of the target slot 29, is provided on the support plate 61. The turning mechanism body 52 is slidably provided along the rail provided on the support plate 61. A circumferential movement lever 60a operable by the operator is provided on the left side of the turning mechanism body 52 as viewed from the operator side. Thus, the operator can operate the circumferential movement lever 60a, thereby moving the turning mechanism 5 and the wire clamper 4 supported by the turning mechanism 5 along the circumferential direction of the target slot 29.

The circumferential fixing mechanism 62 includes a columnar stopper 621 and clamp screws 622, 623 provided on both right and left sides of the stopper 621 as viewed from the operator side. The stopper 621 is fixed to the support plate 61. The clamp screws 622, 623 are screwed into brackets of the turning mechanism body 52 provided on both right and left sides of the stopper 621. Thus, the operator can operate the circumferential movement lever 60a to fasten the clamp screws 622, 623 and sandwich the stopper 621 with the clamp screws 622, 623 after the position of the base point P along the circumferential direction of the target slot 29 has been adjusted, thereby fixing the position along the circumferential direction of the target slot 29.

The vertical movement mechanism 63 includes a support rod 64 supporting the circumferential movement mechanism 60 and a height adjustment handle 65 and a height fixing lever 66 operable by the operator.

The support rod 64 is in a columnar shape extending along the vertical direction, and is provided on the left side of the turn table 31 as viewed from the operator side. A rail 641 extending along the vertical direction is formed on the support rod 64. The support plate 61 of the circumferential movement mechanism 60 is slidably provided along the rail 641.

A mechanism that converts rotational motion of the height adjustment handle 65 into linear motion of the support plate 61 along the rail 641 is provided in the support rod 64. Thus, the operator can operate the height adjustment handle 65 to rotate forward or backward, thereby moving the circumferential movement mechanism 60, the turning mechanism 5, and the wire clamper 4 up and down along the vertical direction to adjust the height of the base point P along the vertical direction. Moreover, the operator can operate the height fixing lever 66 after the height of the base point P along the vertical direction has been adjusted by operation of the height adjustment handle 65, thereby fixing the position of the support plate 61 with respect to the rail 641 and fixing the height of the base point P along the vertical direction accordingly.

On the support rod 64, a circular columnar stopper 642 extending along the vertical direction and a stopper height adjustment mechanism 643 that adjusts the height of the stopper 642 on the support rod 64 along the vertical direction according to the type of stator 2 are provided on the right side of the height adjustment handle 65 as viewed from the operator side. An abutting bolt 645 is provided above the stopper 642 in the vertical direction on the support plate 61.

Thus, when the operator operates the height adjustment handle 65 to lower the support plate 61, the abutting bolt 645 comes into contact with the stopper 642, and therefore, downward movement of the support plate 61 in the vertical direction is restricted. The height of the stopper 642 as described herein is, in a state in which the abutting bolt 645 contacts the stopper 642, adjusted such that the tip end portions of the divided claws 41, 42 contact the base of the tip end portion 263 of the wire leg portion 261 as shown in FIG. 8.

The height of the tip end portion 263 (i.e., a height from the table 3 to the tip end portion 263 along the vertical direction) varies according to the type of stator 2. Thus, if the height of the divided claw 41, 42 along the vertical direction is too low, there is a probability that the divided claws 41, 42 collide with the wire leg portion 261 and the wire leg portion 261 is bent in an unintended direction. The vertical movement mechanism 63 sets the height of the stopper 642 to a height suitable for the type of stator 2 by the stopper height adjustment mechanism 643, and therefore, the extremely low height of the divided claw 41, 42 is avoided.

The radial movement mechanism 68 is, on the main table 30, provided on the left side of the turn table 31 as viewed from the operator side. The radial movement mechanism 68 includes a slide rail 681 provided on the main table 30 and extending along the radial direction of the target slot 29, a support 682 slidable along the slide rail 681, a screw shaft 683 extending parallel with the slide rail 681, bearings 684 rotatably supporting both end portions of the screw shaft 683, and a rotary handle 685 provided on the end portion of the screw shaft 683.

The support rod 64 of the vertical movement mechanism 63 is fixed to an upper surface of the support 682. Thus, the vertical movement mechanism 63, the circumferential movement mechanism 60, the turning mechanism 5, and the wire clamper 4 are, together with the support 682, slidable along the slide rail 681. The screw shaft 683 is screwed into the support 682. Thus, when the operator rotates the rotary handle 685 forward or backward to rotate the screw shaft 683 forward or backward, the support 682 moves along the direction of extension of the slide rail 681, i.e., the radial direction of the target slot 29. Thus, the operator can operate the rotary handle 685, thereby adjusting the position of the base point P along the radial direction of the target slot 29.

The computer 7 displays, on the touch panel display 8, the data transmitted from the wire tip end inspection apparatus 13, the arithmetic processing result based on such data, etc.

Figure 10A:
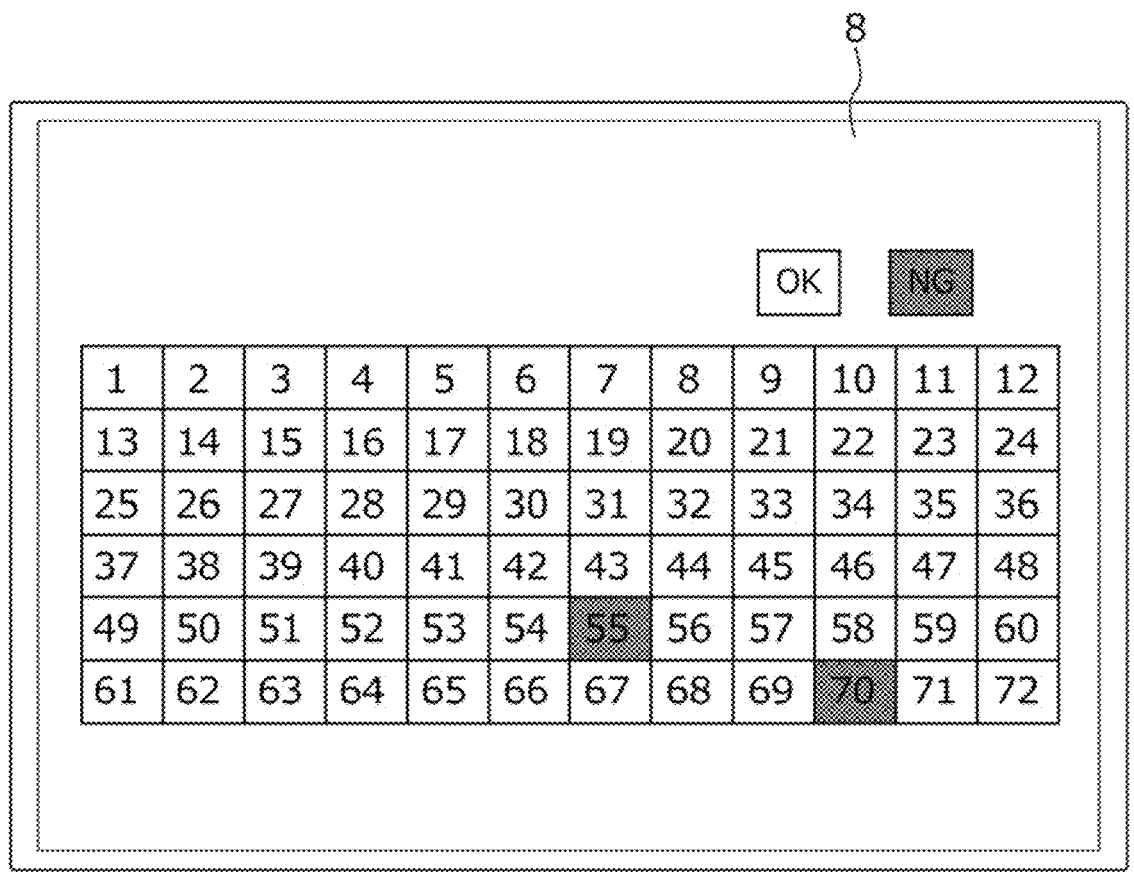
FIG. 10A is a view showing one example of an initial screen.

First, when the computer 7 receives the data transmitted from the wire tip end inspection apparatus 13, the computer 7 displays, on the touch panel display 8, an initial screen as shown in, e.g., FIG. 10A to inform the operator of the slot numbers in which the tip end portions 263 not arranged at the proper positions are present.

FIG. 10A shows a case where all slot numbers (1 to 72) are displayed in a matrix. In this case, the computer 7 preferably displays, as shown in FIG. 10A, the slot numbers (i.e., the slot numbers not needing correction) in which all tip end portions 263 are arranged at the proper positions and the slot numbers (i.e., the slot numbers needing correction) in which the tip end portions 263 not arranged at the proper positions are present such that these slot numbers are color-coded. Note that an example shown in FIG. 10A shows a case where the tip end portions 263 not arranged at the proper positions are present in the 55th slot and the 70th slot. The operator can view the screen as shown in FIG. 10A, thereby easily grasping the slot numbers needing correction.

When the touch panel display 8 is operated by the operator while the initial screen as shown in FIG. 10A is displayed, the computer 7 displays a detailed screen as shown in, e.g., FIG. 10B on the touch panel display 8. More specifically, FIG. 10B shows an example of the displayed detailed screen in a case where the operator has selected the 55th slot number needing correction on the initial screen shown in FIG. 10A.

As shown in FIG. 10B, on the detailed screen after selection of the slot number, a field 101 indicating the slot number selected by the operator, a field 102 indicating the shift direction and amount of each turn, an arithmetic processing button 103 operable by the operator, and a field 104 indicating the arithmetic processing result from the computer 7 are displayed in this order from the top.

The computer 7 displays, based on the data transmitted from the wire tip end inspection apparatus 13, the shift direction and amount of the tip end position of each turn with respect to the reference position in the slot number selected by the operator. In FIG. 10B, "CW" indicates the clockwise side in the circumferential direction, and "CCW" indicates the counterclockwise side in the circumferential direction. The computer 7 preferably displays a case where the shift amount exceeds the threshold Acw, Accw described with reference to FIG. 4 and the tip end position needs to be moved to the reference position and a case where the shift amount does not exceed the threshold Acw, Accw and the tip end position does not need to be moved to the reference position such that these cases are color-coded as shown in FIG. 10B. Note that FIG. 10B shows a case where the shift amount of the fifth turn exceeds Accw (a5>Accw) and the shift amount of the seventh turn exceeds Acw (a7>Acw).

While the detailed screen as shown in FIG. 10B is displayed, when the operator performs the operation of selecting the turn number needing correction and presses the arithmetic processing button 103, the computer 7 performs arithmetic processing described below with reference to FIGS. 11 to 13 based on the shift direction and amount of the selected turn number to calculate a correction direction and a correction angle, and displays these arithmetic processing results of the correction direction and angle in the field 104. Note that FIG. 10B shows, as an example, a case where the operator has selected the fifth turn.

The "correction direction" described herein is a direction in which the tip end position of the wire leg portion 261 needs to be moved such that the tip end position approaches the reference position, and is any of the clockwise side (CW) in the circumferential direction and the counterclockwise side (CCW) in the circumferential direction. Moreover, the "correction angle" means the claw angle that the divided claws 41, 42 need to be turned about the center axis 53a passing through the base point. P while holding the tip end portion 263 as shown in FIG. 8 such that a state in which the tip end position of the wire leg portion 261 and the reference position are shifted from each other changes to a state in which the tip end position and the reference position are coincident with each other.

Figure 11:
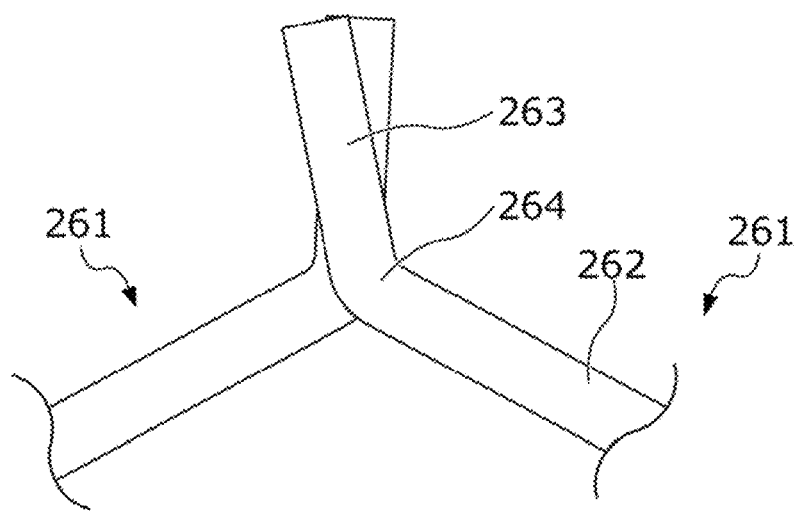
FIG. 11 is a view of a wire leg portion of a first turn at a reference position and a wire leg portion whose tip end position is shifted clockwise in a circumferential direction with respect to the reference position as viewed from an outer side along a radial direction.

FIG. 11 is, as viewed from the outer side along the radial direction, a view of the wire leg portion 261 of the first turn at the reference position and the wire leg portion 261 whose tip end position is shifted clockwise in the circumferential direction with respect to the reference position.

As shown in FIG. 11, the tip end position needs to be moved to a direction opposite to the direction of shift from the reference position such that the tip end position of the wire leg portion 261 shifted from the reference position approaches the reference position. Thus, the computer 7 displays, in the field 104, the opposite direction of the shift direction as the correction direction.

Figure 12:
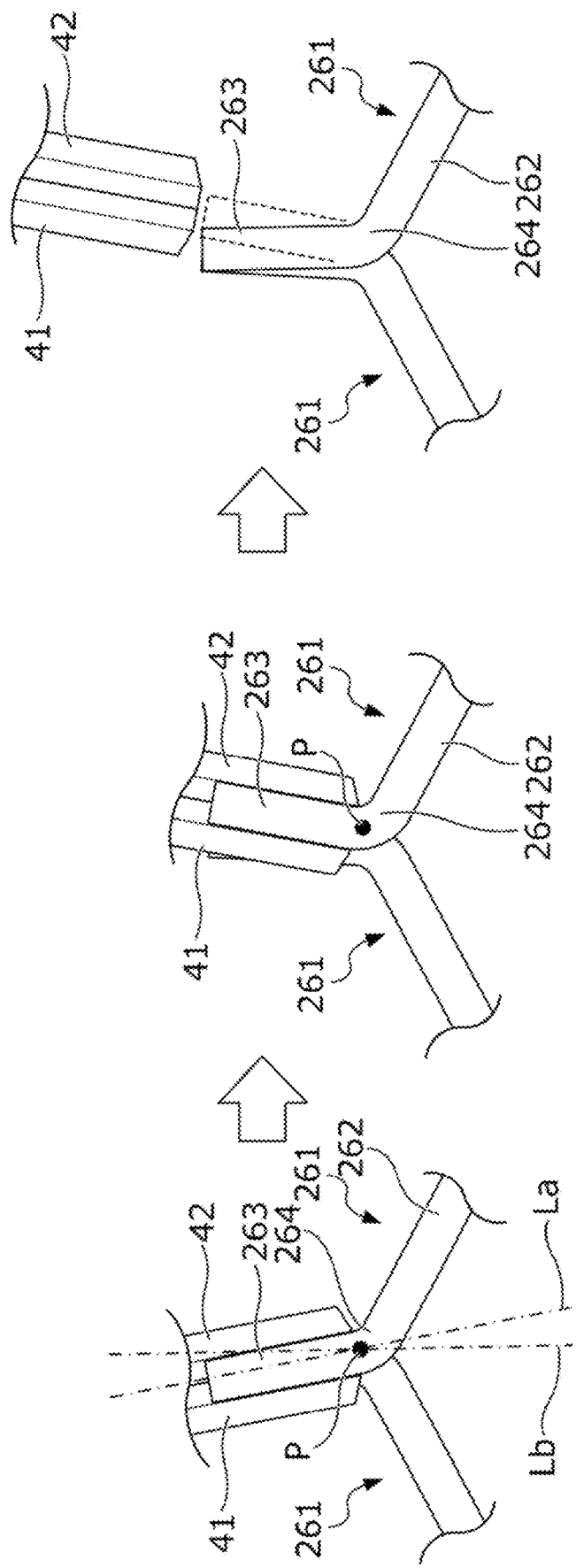
FIG. 12 schematically shows steps of moving the tip end position of the wire leg portion to the reference position by divided claws.
Figure 13:
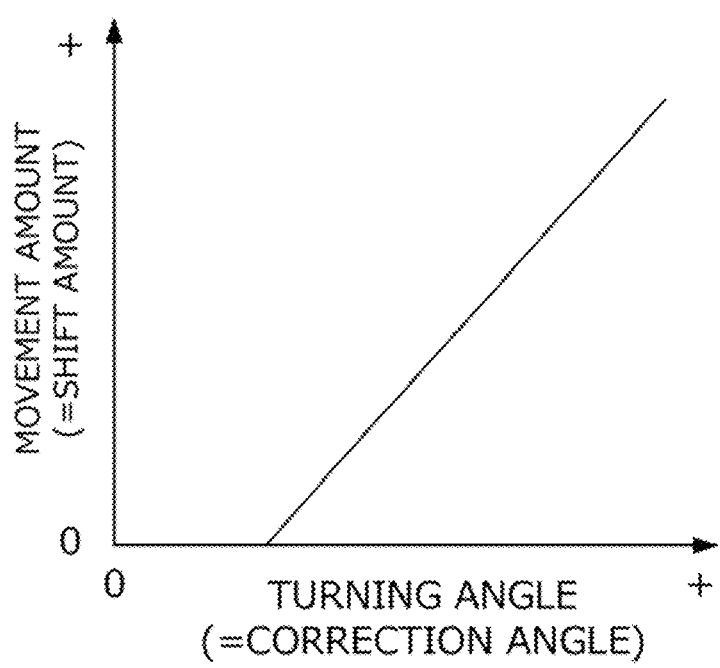
FIG. 13 is one example of a map built based on a correlation between a turning angle of the divided claw and a tip end position movement amount taking spring back into consideration.

FIG. 12 schematically shows steps of moving the tip end position of the wire leg portion 261 to the reference position by the divided claws 41, 42. The left side of FIG. 12 shows a state in which the tip end portion 263 of the wire leg portion 261 is held by the divided claws 41, 42, the center of FIG. 12 shows a state after the wire leg portion 261 has been bent in such a manner that the divided claws 41, 42 are turned by a predetermined claw angle about the tip end portions of the divided claws 41, 42 as the base point P, and the right side of FIG. 12 shows a state after the divided claws 41, 42 have been detached from the wire leg portion 261 after bending of the wire leg portion 261.

As shown in FIG. 12, after the wire leg portion 261 has been bent by the divided claws 41, 42, when the divided claws 41, 42 are detached from the wire leg portion 261, the tip end position of the wire leg portion 261 moves to the opposite direction of the correction direction due to spring back. For this reason, the computer 7 sets, considering a return range due to the spring back, the correction angle of the divided claw 41, 42 to an angle greater than an angle between a line La passing through the pre-corrected tip end position and the base point P and a line Lb passing through the reference position and the base point P such that the tip end position and the reference position are coincident with each other.

More specifically, the computer 7 stores a map (see FIG. 13) built based on a correlation between the turning angle of the divided claw 41, 42 about the center axis 53a passing through the base point P and a tip end position movement amount taking the spring back of the wire leg portion 261 after bending into consideration. Such a map can be built by a test conducted in advance. The computer 7 conducts a search on the map as shown in FIG. 13, taking, as the movement amount, the shift amount transmitted from the wire tip end inspection apparatus 13. In this manner, the computer 7 calculates, considering the return range due to the spring back, the correction angle that the tip end position and the reference position are coincident with each other, and displays the correction angle in the field 104.

Next, the specific steps of correcting the tip end position of the wire leg portion to the reference position by means of the wire position correction apparatus 14 as described above will be described.

Figure 14:
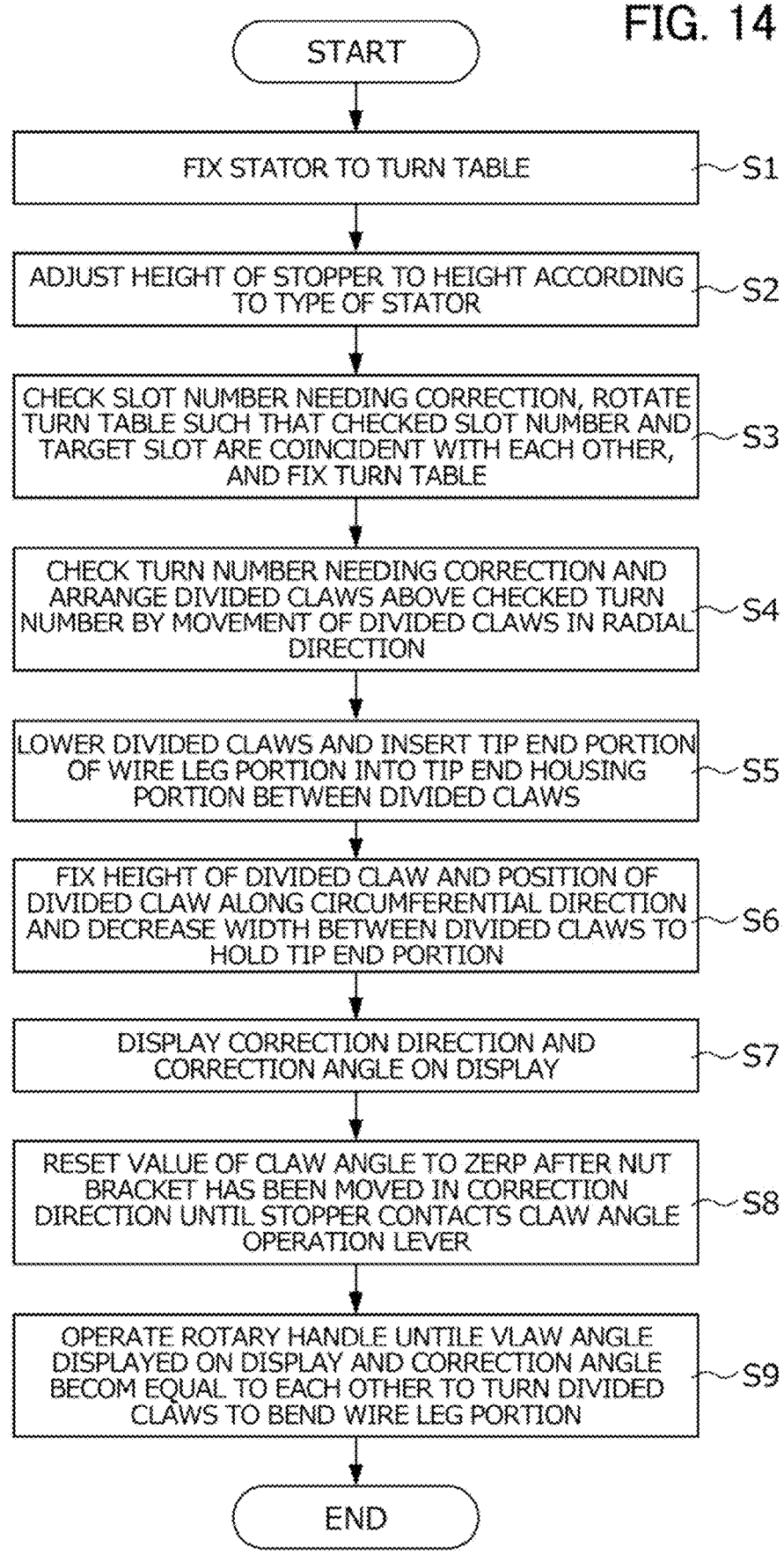
FIG. 14 is a flowchart showing specific steps of a wire position correction method.

FIG. 14 is a flowchart showing the specific steps of the wire position correction method. First, at S1, the operator fixes the stator 2 to the turn table 31. At S2, the operator operates the stopper height adjustment mechanism 643 of the vertical movement mechanism 63, thereby setting the height of the stopper 642 to the height suitable for the type of stator 2 fixed to the turn table 31.

At S3, the operator views the initial screen (see FIG. 10A) displayed on the touch panel display 8, thereby checking the slot number needing correction. Moreover, at S3, the operator rotates the turn table 31 such that the checked slot number and the target slot 29 are coincident with each other, and thereafter, operates the slot position fixing lever 33 to fix the turn table 31.

At S4, the operator views the detailed screen (see FIG. 10B) displayed on the touch panel display 8, thereby checking the turn number needing correction. Moreover, at S4, the operator operates the rotary handle 685 of the radial movement mechanism 68 to move the divided claws 41, 42 along the radial direction of the stator 2, thereby arranging the divided claws 41, 42 above the checked turn number in the vertical direction. In this manner, the wire leg portion 261 needing correction is arranged below the divided claws 41, 42 in the vertical direction.

At S5, the operator operates the height adjustment handle 65 of the vertical movement mechanism 63 in a state in which the divided claws 41, 42 are opened, thereby lowering the divided claws 41, 42 until the abutting bolt 645 contacts the stopper 642 and inserting the tip end housing portion 47 between the divided claws 41, 42 onto the tip end portion 263 of the wire leg portion 261 targeted for correction (see the left side of FIG. 12). Note that at this point, the operator operates the rotary handle 685, the circumferential movement lever 60a, and the claw angle operation lever 54 as necessary, thereby inserting the tip end housing portion 47 between the divided claws 41, 42 onto the tip end portion 263 along the direction thereof while finely adjusting the radial and circumferential directions and claw angle of the divided claw 41, 42 such that the wire leg portion 261 is not bent by the divided claws 41, 42.

At 56, the operator operates the height fixing lever 66 of the vertical movement mechanism 63 and the clamp screws 622, 623 of the circumferential movement mechanism 60 in a state in which the tip end portion 263 of the wire leg portion 261 is inserted into the tip end housing portion 47, thereby fixing the height of the divided claw 41, 42 along the vertical direction and the position of the divided claw 41, 42 along the circumferential direction. Moreover, at S6, the operator operates the grip 45 of the wire clamper 4 to decrease the width between the divided claws 41, 42, thereby sandwiching both side portions 263a, 263b of the tip end portion 263 between the divided claws 41, 42 to hold the tip end portion 263.

At 57, the operator operates the touch panel display 8, thereby displaying the arithmetic processing results of the correction direction and angle on the touch panel display 8.

At S8, the operator operates the rotary handle 553 of the claw angle adjustment mechanism 55, thereby moving the nut bracket 554 in the correction direction until any of the stoppers 555, 556 contacts the claw angle operation lever 54.

Moreover, the operator presses the reset button 57*a* of the display 57 in a state in which any of the stoppers 555, 556 lightly contacts the claw angle operation lever 54, thereby resetting the value of the claw angle to zero.

At S9, the operator operates the rotary handle 553 of the claw angle adjustment mechanism 55 until the claw angle displayed on the display 57 and the correction angle displayed on the touch panel display 8 become equal to each other, thereby turning the divided claws 41, 42 about the center axis 53*a* passing through the base point P set on the bent portion 264 such that the tip end position moves in the correction direction. In this manner, the wire leg portion 261 is bent. According to the wire position correction apparatus 14 of the present embodiment, the following advantageous effects are achieved.

(1) The wire position correction apparatus 14 includes the wire clamper 4 that holds the tip end portion 263 of the wire leg portion 261 protruding from the slot 22 of the stator core 21 and the turning mechanism 5 that supports the wire clamper 4 and turns the divided claws 41, 42 about the center axis 53*a* passing through the base point P set on the bent portion 264 such that the tip end position of the wire leg portion 261 moves in the direction approaching the reference position. According to the wire position correction apparatus 14, the divided claws 41, 42 are turned by the turning mechanism 5 in a state in which the tip end portion 263 of the wire leg portion 261 is held by the divided claws 41, 42, thereby bending the wire leg portion 261. Thus, the tip end position can approach the reference position without the need for shifting the position of a slot-22-side portion of the wire leg portion 261 with respect to the base point P or bending such a portion. Consequently, as compared to the case of bending a base of a wire leg portion as in a typical case, the return range of the tip end portion 263 due to the spring back after bending can be narrowed. With this configuration, the tip end position of the target wire leg portion 261 can be corrected with favorable accuracy.

(2) The wire position correction apparatus 14 includes the computer 7 that calculates the correction angle necessary for correcting the tip end position to the reference position based on the map defining the correlation between the turning angle of the divided claw 41, 42 about the center axis 53*a* passing through the base point P and the tip end position movement amount taking the spring back of the wire leg portion 261 after bending into consideration. According to the wire position correction apparatus 14, the divided claws 41, 42 are turned by the correction angle calculated by the computer 7. Thus, the tip end position can be corrected with favorable accuracy, considering the spring back of the wire leg portion 261 after bending.

(3) The wire position correction apparatus 14 includes the table 3 supporting the stator 2 in a state in which the wire leg portion 261 faces up in the vertical direction and the movement mechanism 6 that moves the wire clamper 4 and the turning mechanism 5 on the table 3 along the vertical direction, the circumferential direction, and the radial direction. According to the wire position correction apparatus 14, when the tip end portion 263 of the wire leg portion 261 is held by the divided claws 41, 42, the divided claws 41, 42 can approach the tip end portion 263 of the wire leg portion 261 while the turning angle of the divided claw 41, 42 and the position of the divided claw 41, 42 along the vertical direction, the circumferential direction, and the radial direction are being finely adjusted. With this configuration, when the divided claws 41, 42 approach the tip end portion 263, the probability of the position of the target wire leg portion 261 being shifted or the target wire leg portion 261 being bent due to contact of the divided claws 41, 42 with the tip end portion 263 can be prevented. Thus, the tip end position of the target wire leg portion 261 can be corrected with favorable accuracy.

(4) In the wire position correction apparatus 14, one including the divided claws 41, 42 extending along both side portions 263*a*, 263*b* of the tip end portion 263 and the chuck mechanism 44 that changes the width between the divided claws 41, 42 is used as the wire clamper 4. With this configuration, after the tip end portion 263 has been inserted into the tip end housing portion 47 between the divided claws 41, 42 in a state in which the claw width is increased, the claw width is decreased so that the tip end portion 263 can be held by the divided claws 41, 42. Thus, when the divided claws 41, 42 are turned about the center axis 53*a* to bend the wire leg portion 261, the probability of the tip end portion 263 of the wire leg portion 261 being shifted from the divided claws 41, 42 and the wire leg portion 261 being bent at an unintended portion can be prevented. Consequently, the tip end position of the target wire leg portion 261 can be corrected with favorable accuracy.

(5) At the torsion bending step performed before correction of the tip end position of the wire 26, the wire 26 protruding from the slot 22 is twisted and bent. In this manner, the wire leg portion 261 including the inclined portion 262 inclined with respect to the axial direction of the slot 22 and the tip end portion 263 extending along the axial direction of the slot 22 is formed. The divided claws 41, 42 sandwich both side portions 263*a*, 263*b* of the tip end portion 263 along the circumferential direction, thereby holding the tip end portion 263. The turning mechanism 5 turns the divided claws 41, 42 about the center axis 53*a*. According to the wire position correction apparatus 14, the divided claws 41, 42 are turned about the center axis 53*a* passing through the base point P and extending perpendicularly to the above-described circumferential direction, thereby bending the wire leg portion 261. Thus, misalignment of the tip end portion 263 along the circumferential direction upon torsion bending can be corrected.

One embodiment of the present invention has been described above, but the present invention is not limited to such an embodiment. Detailed configurations may be changed as necessary within the scope of the gist of the present invention.

In the above-described embodiment, the case where the wire clamper 4 including the divided claws 41, 42 is used as a holding apparatus that holds the tip end portion of the wire leg portion has been described, but the present invention is not limited to such a case. For example, a tubular member into which the tip end portion of the wire leg portion can be inserted may be used as the holding apparatus.

In the above-described embodiment, the case where the base point P is set on the bent portion 264 in such a manner that the divided claws 41, 42 are lowered until the abutting bolt 645 contacts the stopper 642, i.e., until the tip end portions of the divided claws 41, 42 contact the base of the tip end portion 263 of the wire leg portion 261 has been described, but the present invention is not limited to such a case. The base point P may be set to a tip end portion 263 side with respect to the bent portion 264.

What is claimed is:

1. A wire position correction apparatus for correcting, in a stator including an annular stator core formed with a plurality of slots and a plurality of wires arranged in the slots, a tip end position of a wire leg portion of one of the wires protruding from a corresponding one of the slots to a reference position, comprising:
   a holding apparatus configured to hold a tip end portion of the wire leg portion on a tip end side with respect to a bent portion; and
   a turning mechanism configured to support the holding apparatus and configured to turn the holding apparatus about a center axis passing through the bent portion or a base point on a tip end portion side with respect to the bent portion such that the tip end position moves in a direction approaching the reference position.

2. The wire position correction apparatus according to claim 1, further comprising:
   a turning angle calculation unit configured to calculate a turning angle of the holding apparatus necessary for correcting the tip end position to the reference position based on a correlation between the turning angle about the center axis and a tip end position movement amount taking spring back of the wire leg portion ae bending into consideration.

3. The wire position correction apparatus according to claim 2, further comprising a table configured to supporting the stator in a state in which the wire leg portion faces up in a vertical direction and wherein the holding apparatus and the turning mechanism are movable on the table along the vertical direction, a circumferential direction of the stator core, and a radial direction of the stator core.

4. The wire position correction apparatus according to claim 3, wherein the holding apparatus includes a divided claw configured to extend along both side portions of the tip end portion and a chuck mechanism configured to change a width of the divided claws.

5. The wire position correction apparatus according to claim 2, wherein the holding apparatus is configured to sandwich both side portions of the tip end portion along a circumferential direction of the stator core, and the turning mechanism is configured to turn the holding apparatus about the center axis.

6. The wire position correction apparatus according to claim 1, further comprising a table configured to support the stator in a state in which the wire leg portion faces up in a vertical direction, and wherein the holding apparatus and the turning mechanism are movable on the table along the vertical direction, a circumferential direction of the stator core, and a radial direction of the stator core.

7. The wire position correction apparatus according to claim 6, wherein the holding apparatus includes a divided claw configured to extend along both side portions of the tip end portion and a chuck mechanism configured to change a width of the divided claws.

8. The wire position correction apparatus according to claim 7, wherein the holding apparatus is configured to sandwich both side portions of the tip end portion along the circumferential direction, and the turning mechanism is configured to turn the holding apparatus about the center axis.

9. The wire position correction apparatus according to claim 6, wherein the holding apparatus is configured to sandwich both side portions of the tip end portion along the circumferential direction, and the turning mechanism is configured to turn the holding apparatus about the center axis.

10. The wire position correction apparatus according to claim 1, wherein the holding apparatus is configured to sandwich both side portions of the tip end portion along a circumferential direction of the stator core, and the turning mechanism is configured to turn the holding apparatus about the center axis.

* * * * *